United States Patent
Son et al.

(10) Patent No.: US 10,389,873 B2
(45) Date of Patent: Aug. 20, 2019

(54) ELECTRONIC DEVICE FOR OUTPUTTING MESSAGE AND METHOD FOR CONTROLLING THE SAME

(71) Applicant: Samsung Electronics Co., Ltd., Suwon-si, Gyeonggi-do (KR)

(72) Inventors: Dong-Il Son, Hwaseong-si (KR);
Seung-Nyun Kim, Incheon (KR);
So-Young Lee, Gwacheon-si (KR);
Chi-Hyun Cho, Suwon-si (KR);
Kyung-Tae Kim, Hwaseong-si (KR);
Chang-Ryong Heo, Suwon-si (KR);
Sung-Hyuk Shin, Seongnam-si (KR);
Ji-Min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 15/085,314

(22) Filed: Mar. 30, 2016

(65) Prior Publication Data
US 2016/0352895 A1 Dec. 1, 2016

(30) Foreign Application Priority Data
Jun. 1, 2015 (KR) .................... 10-2015-0077504

(51) Int. Cl.
*H04M 3/42* (2006.01)
*H04L 12/58* (2006.01)
*G10L 13/033* (2013.01)
*G06F 17/28* (2006.01)
*G06F 17/27* (2006.01)
*G10L 13/08* (2013.01)

(52) U.S. Cl.
CPC ...... *H04M 3/42017* (2013.01); *G06F 17/289* (2013.01); *G10L 13/033* (2013.01);
(Continued)

(58) Field of Classification Search
CPC ... H04W 4/12; H04W 4/008; H04W 36/0055; H04W 4/16; H04W 4/18; H04W 4/206; H04W 88/184; H04W 4/14; H04M 1/72552; H04M 1/72547; H04M 1/72519; H04M 1/72541; H04M 1/72555; H04M 1/72555; H04M 1/72569; H04M 2203/256; H04M 2250/52; H04M 3/5322;
(Continued)

(56) References Cited

U.S. PATENT DOCUMENTS

2004/0225650 A1* 11/2004 Cooper ................ H04M 3/527
2009/0210497 A1* 8/2009 Callanan ................ H04L 51/04
709/206

(Continued)

FOREIGN PATENT DOCUMENTS

CN 103634448 A * 3/2014
JP 2004-90109 A 3/2004
(Continued)

*Primary Examiner* — George Eng
*Assistant Examiner* — Jing Gao
(74) *Attorney, Agent, or Firm* — Jefferson IP Law, LLP

(57) ABSTRACT

A method for controlling an electronic device is provided. The method includes obtaining a message from a sender, identifying a recipient of the message, converting the message based on first relationship information between the sender and the recipient and second relationship information between the recipient and the electronic device, and outputting the converted message.

22 Claims, 29 Drawing Sheets

(52) U.S. Cl.
CPC ............ *H04L 51/04* (2013.01); *H04L 51/063* (2013.01); *H04L 51/12* (2013.01); *H04M 3/42382* (2013.01); *G06F 17/278* (2013.01); *G10L 13/08* (2013.01); *H04L 51/32* (2013.01); *H04M 2201/39* (2013.01); *H04M 2201/60* (2013.01)

(58) Field of Classification Search
CPC ......... H04M 3/53333; H04M 3/53366; H04M 3/42017; H04M 3/42; H04M 203/256; H04M 250/52; H04M 3/5333; G06F 17/28; G06F 17/289; G10L 13/033; G10L 21/007; H04L 51/04; H04L 51/063; H04L 51/12
See application file for complete search history.

(56) References Cited

U.S. PATENT DOCUMENTS

| | | |
|---|---|---|
| 2009/0254345 A1 | 10/2009 | Fleizach et al. |
| 2010/0066742 A1 | 3/2010 | Qian et al. |
| 2012/0115453 A1 | 5/2012 | Zheng |
| 2013/0023287 A1 | 1/2013 | Shaw et al. |
| 2013/0144951 A1 | 6/2013 | Viswanath et al. |
| 2013/0325971 A1 | 12/2013 | Winer |
| 2014/0019135 A1* | 1/2014 | Talwar .................. G10L 13/033 704/260 |
| 2014/0095151 A1 | 4/2014 | Sakamoto et al. |
| 2014/0277735 A1 | 9/2014 | Breazeal |
| 2016/0148018 A1* | 5/2016 | Sugiura ............... G06F 21/6254 726/28 |

FOREIGN PATENT DOCUMENTS

| | | | | |
|---|---|---|---|---|
| JP | 2014-071769 A | 4/2014 | | |
| JP | WO 2014203402 A1 * | 12/2014 | ......... | G06F 21/6254 |
| KR | 2004-0014123 A | 2/2004 | | |
| KR | 2009-0072778 A | 7/2009 | | |
| KR | 2011-0030204 A | 3/2011 | | |
| KR | 2014-0123369 A | 10/2014 | | |
| WO | WO-2014203402 A1 * | 12/2014 | ......... | G06F 21/6254 |

\* cited by examiner

ELECTRONIC DEVICE FOR OUTPUTTING MESSAGE AND METHOD FOR CONTROLLING THE SAME

CROSS-REFERENCE TO RELATED APPLICATION(S)

This application claims the benefit under 35 U.S.C. § 119(a) of a Korean patent application filed on Jun. 1, 2015 in the Korean Intellectual Property Office and assigned Serial number 10-2015-0077504, the entire disclosure of which is hereby incorporated by reference.

TECHNICAL FIELD

The present disclosure relates to electronic devices for outputting messages and methods for controlling the same. More particularly, the present disclosure relates to electronic devices for outputting messages received from transmitters and methods for controlling the same.

BACKGROUND

Recently, user interactable electronic devices widely come in use. An electronic device of the related art receiving a message from a transmitter may provide the received message to the user in various forms. For example, such an electronic device of the related art may display the received message on the display. Or, the electronic device of the related art may synthesize the received message into a voice and output the synthesized voice. In such case, the electronic device of the related art may display the received message as it is or may output the received message as a voice. When outputting the received message as a voice, the electronic device of the related art may do using a mechanical sound basically embedded therein.

As described above, the electronic device of the related art outputs the received message according to a predetermined algorithm and thus has difficulty making the user feel like he naturally receives the service not from an electronic device but from a human being. Further, there is no disclosure as to electronic devices capable of flexibly converting and outputting messages depending on various situations the user is facing.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that may convert and output messages according to the electronic device and a transmitter and receiver and a method for controlling the electronic device.

In accordance with an aspect of the present disclosure, a method for controlling an electronic device is provided. The method includes obtaining a message from a sender, identifying a recipient of the message, converting the message based on first relationship information between the sender and the recipient and second relationship information between the recipient and the electronic device, and outputting the converted message.

In accordance with another aspect of the present disclosure, an electronic device is provided. The electronic device includes a processor configured to obtain a message from a sender and a memory electrically connected to the processor, wherein the memory may be configured to store instructions executed to enable the processor to identify a recipient of the message, convert the message based on first relationship information between the sender and the recipient and second relationship information between the recipient and the electronic device, and perform control to output the converted message.

In accordance with another aspect of the present disclosure, a method for controlling an electronic device is provided. The method includes obtaining a message from a sender, identifying a recipient of the message, determining at least one voice variable based on relationship information between the sender and the recipient, and outputting the message according to the determined at least one voice variable.

In accordance with another aspect of the present disclosure, an electronic device is provided. The electronic device includes a speaker, a processor configured to obtain a message from a sender and electrically connected with the speaker, and a memory electrically connected to the processor, wherein the memory may be configured to store instruction executed to enable the processor to identify a recipient of the message, determine at least one voice variable based on relationship information between the sender and the recipient and control the speaker to output the message according to the determined at least one voice variable.

In accordance with another aspect of the present disclosure, a method for controlling an electronic device communicating with a plurality of other electronic devices is provided. The method includes generating a group chatting session between the plurality of other electronic devices, receiving a message through the group chatting session from a first electronic device of the plurality of other electronic devices, converting the received message according to user information corresponding to each of remaining electronic devices other than the first electronic device among the plurality of other electronic devices to generate a plurality of converted messages, and transmitting each of the plurality of converted messages to each of the remaining electronic devices.

In accordance with another aspect of the present disclosure, an electronic device is provided. The electronic device includes a communication module configured to perform communication with a plurality of other electronic devices, a processor electrically connected to the communication module, and a memory electrically connected to the processor, wherein the memory may be configured to store instructions executed to enable the processor to generate a group chatting session between the plurality of other electronic devices, when the communication module receives a message through the group chatting session from a first electronic device of the plurality of other electronic devices, convert the received message according to user information corresponding to each of remaining electronic devices other than the first electronic device among the plurality of other electronic devices to generate a plurality of converted messages, and control the communication module to transmit each of the plurality of converted messages to each of the remaining electronic devices.

In accordance with another aspect of the present disclosure, a method for controlling an electronic device is provided. The method includes obtaining a message from a sender, analyzing a content of the message, converting the message using at least one of a voice determination variable, a text generation variable, and a behavior variable corresponding to the content, and outputting the converted message.

In accordance with another aspect of the present disclosure, an electronic device is provided. The electronic device includes a processor configured to obtain a message from a sender and a memory electrically connected to the processor, wherein the memory may store instructions executed to enable the processor to analyze a content of the message, convert the message using at least one of a voice determination variable, a text generation variable, and a behavior variable corresponding to the content, and perform control to output the converted message.

Another aspect of the present disclosure is to provide an electronic device that may convert and output messages according to the electronic device and a transmitter and receiver and a method for controlling the electronic device. According to various embodiments of the present disclosure, the electronic device and method for controlling the same may flexibly provide various interactions depending on users, allowing the users to feel like they naturally receive services not from an electronic device but from a human being.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
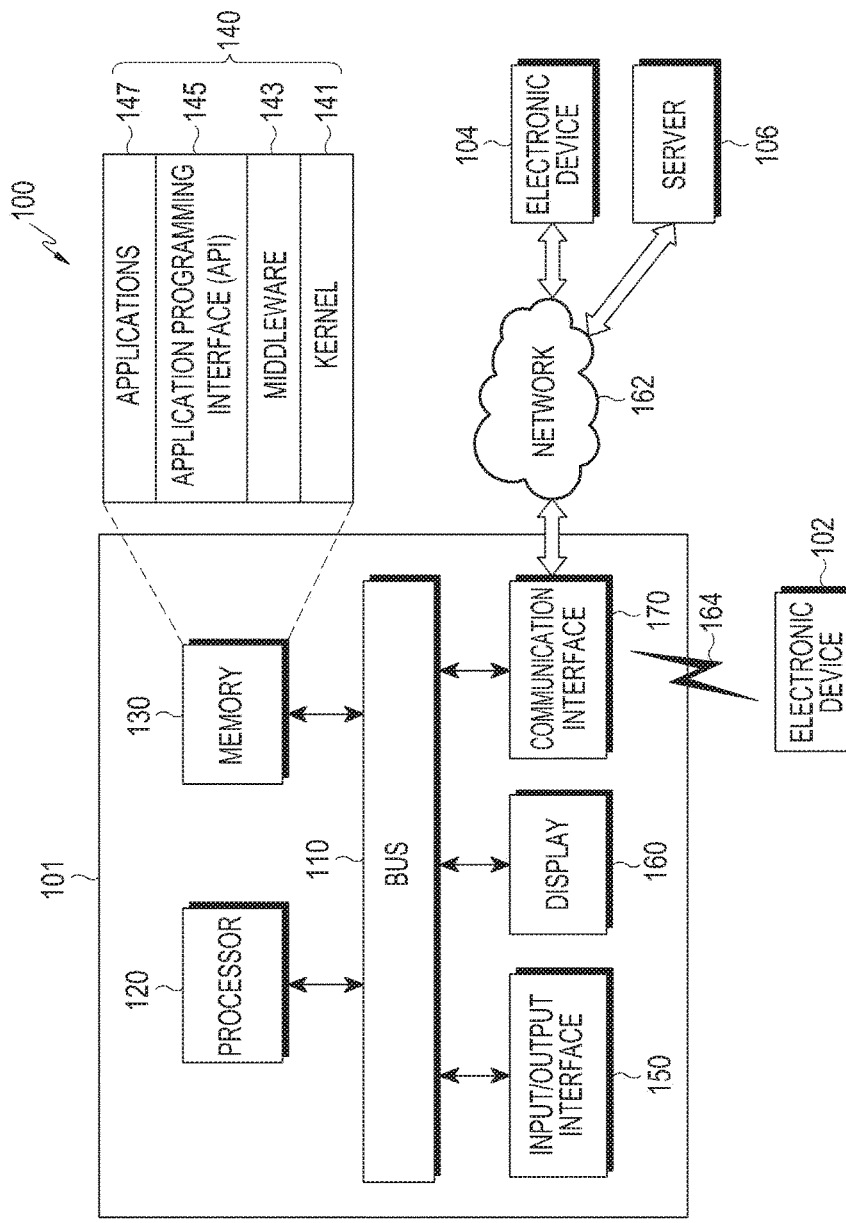
FIG. 1A is a block diagram illustrating an electronic device and a network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the various embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude various embodiments of the present disclosure.

For example, examples of the electronic device according to various embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device. According to an embodiment of the present disclosure, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an embodiment of the present disclosure, the electronic device may be a home appliance. For example, examples of the smart home appliance may include at least one of a television (TV), a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™) a gaming console (Xbox™, PlayStation™), an electronic dictionary, an electronic key, a camcorder, or an electronic picture frame.

According to an embodiment of the present disclosure, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device.

FIG. 1A is a block diagram illustrating an electronic device and a network according to an embodiment of the present disclosure.

Referring to FIG. 1A, according to an embodiment of the present disclosure, an electronic device 101 is included in a network environment 100. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages and/or data) between the components.

The processor 120 may include one or more of a CPU, an AP, a communication processor (CP), a graphic processor (GP), a multi-chip package (MCP), or an image processor (IP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example.

Further, the middleware 143 may process one or more task requests received from the application 147 in order of priority. For example, the middleware 143 may assign at least one of applications 147 with priority of using system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device. The input/output interface 150 may include, e.g., a touch input device, a voice input unit, and various remote control devices. The input/output device 150 may be at least one or more means to provide a particular service to the user. For example, when information to be transferred is a sound, the input/output interface 150 may be a speaker, and when the information is text or image content, the input/output device 150 may be a display device. Further, in order to provide a service under the circumstance where the user does not approach the electronic device 101, data to be output may be transferred to at least one or more other electronic devices through a communication module and may then be output. Here, the other electronic devices may be speakers or other display devices.

The display 160 may include, e.g., a liquid crystal display (LCD), a light emitting diode (LED) display, an organic LED (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with the network 162 through wireless or wired communication to communicate with the external electronic device (e.g., the second external electronic device 104 or server 106). The communication interface 170 may be a means to enable communication of at least one or more data items with other electronic device and may communicate with the other electronic device through at least one or more communication standards, such as Wi-Fi, Zigbee, Bluetooth, long term evolution (LTE), 3rd generation (3G), or infrared (IR) protocols.

The wireless communication may be a cellular communication protocol and may use at least one of, e.g., LTE, LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication 164. The short-range communication 164 may include at least one of Wi-Fi, Bluetooth, near-field communication (NFC), or GNSS. The GNSS may include at least one of, e.g., global positioning system (GPS), global navigation satellite system (Glonass), Beidou navigation satellite system (hereinafter, "Beidou")

or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of telecommunication networks, e.g., a computer network (e.g., local area network (LAN) or wide area network (WAN)), Internet, or a telephone network.

The first and second electronic devices 102 and 104 each may be a device of the same or a different type from the electronic device 101. According to an embodiment of the present disclosure, the server 106 may include a group of one or more servers. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 1B:
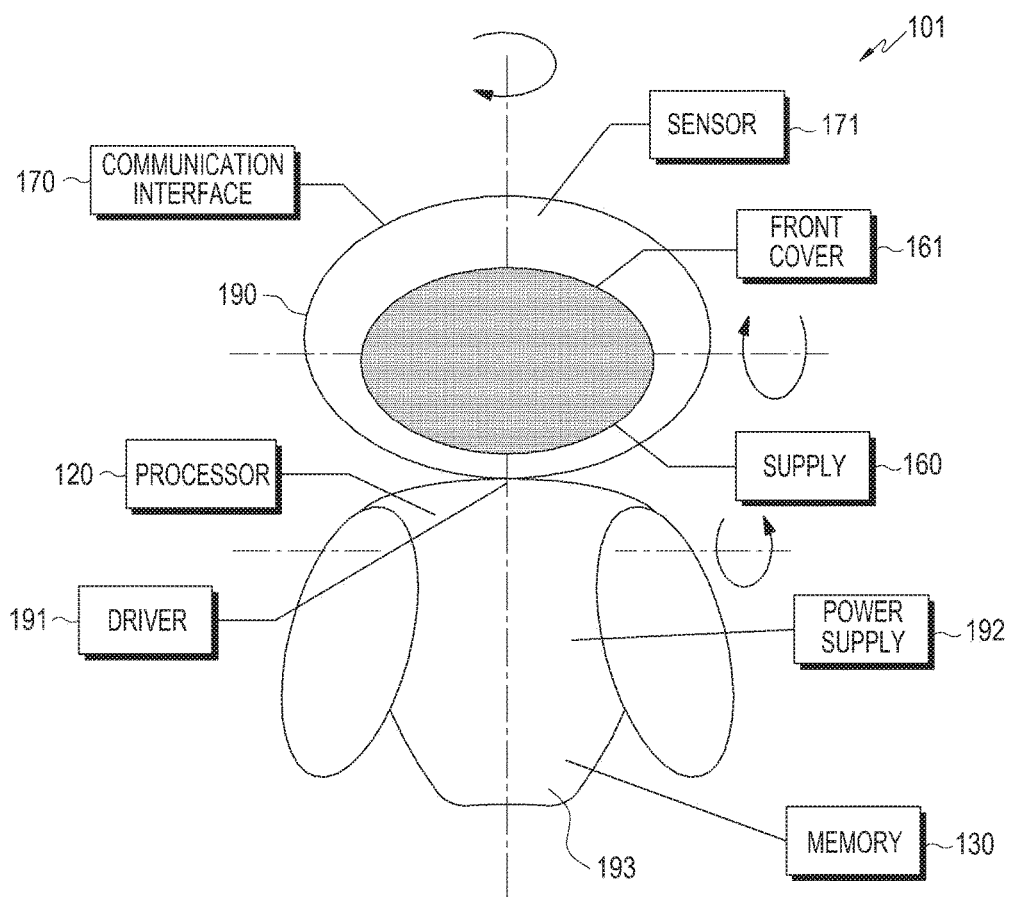
FIG. 1B is a concept view illustrating an implementation example according to an embodiment of the present disclosure.

FIG. 1B is a concept view illustrating an implementation example according to an embodiment of the present disclosure.

Referring to FIG. 1B, the electronic device 101 may be implemented in the form of a robot. The electronic device 101 may include a head portion 190 and a body portion 193. The head portion 190 may be disposed on the body portion 193. The head portion 190 and the body portion 193, in an embodiment, may be implemented in the shape of a human being's head and body, respectively. For example, the head portion 190 may include a front cover 161 corresponding to the shape of a human being's face. The electronic device 101 may include a display 160 disposed at a position corresponding to the front cover 161. For example, the display 160 may be disposed inside the front cover 161, and in this case, the front cover 161 may be formed of a transparent or semi-transparent material. Or, the front cover 161 may be a device that may display any screen, and in such case, the front cover 161 and the display 160 may be implemented as a single hardware device. The front cover 161 may include at least one or more various sensors for image sensing in a direction of interacting with the user, at least one or more microphones for obtaining a voice, and at least one or more hardware (H/W) or instrumental structures that may be an instrumental eye structure or a display for outputting a screen, that enables display through a temporary instrumental change or light in the form of directions being not differentiated, and that may be directed to the user when interacting with the user.

The head portion 190 may further include the communication interface 170 and a sensor 171. The communication interface 170 may receive a message from a transmitter and transmit a converted message to a receiver. According to an embodiment of the present disclosure, the communication interface 170 may be implemented as a microphone, and in this case, the communication interface 170 may receive a voice from the user. According to an embodiment of the present disclosure, the communication interface 170 may be implemented as a speaker, and in this case, the communication interface 170 may output a converted message as a voice.

The sensor 171 may obtain at least one information regarding an external environment. For example, the sensor 171 may be implemented as a camera, and in this case, the sensor 171 may capture the external environment. The electronic device 101 may identify a recipient according to the capturing result. The sensor 171 may sense the approach of the recipient to the electronic device 101. The sensor 171 may sense the approach of the recipient according to proximity information or based on a signal from the electronic device used by the recipient. Further, the sensor 171 may also sense the action or position of the user.

The driver 191 may include at least one motor to actuate the head portion 190, e.g., to change the direction of the head portion 190. The driver 191 may be used to move or instrumentally change other components. Further, the driver 191 may be in the form capable of moving up, down, left, or right with respect to at least one or more axes, and may be implemented to have various forms. The power supply 192 may feed power to the electronic device 101.

The processor 120 may obtain a message from a sender through the communication interface 170 or the sensor 171. The processor 120 may include at least one message analyzing module. The at least one message analyzing module may extract major contents to be transferred to the recipient from a message generated by the sender or may classify the contents.

The memory 130 is storage for permanently or temporarily storing information related to providing a service to the user. The memory 130 may be present in the electronic device or may be present in a cloud or other server through a network. The memory 130 may store personal information for user authentication, attribute-related information relating to the manner of providing a service to the user, or information for grasping the relationship between various means that may interact with the electronic device 101. Here, the relationship information may be updated as the electronic device 101 is used or may be studied and changed. The processor 120 may be in charge of control of the electronic device 101 and may functionally control the sensor 171, the input/output interface 150, the communication interface 170, and the memory 130 to provide a service to the user. Further, at least a portion of the processor 120 or the memory 130 may include an information determining unit that may determine information obtainable by the electronic device 101. Here, the information determining unit may extract at least one or more data for a service from the information obtained through the sensor 171 or the communication interface 170.

Meanwhile, the robot-type implementation of the electronic device 101 is merely an example, and there are no limitations as to the type of implementation.

According to an embodiment of the present disclosure, the processor 120 may obtain a message from the sender. The memory 130 may be electrically connected with the processor 120. The memory 130 may store instructions executed to enable the processor 120 to perform control to identify the recipient of the message, convert the message based on first relationship information between the sender and the recipient and second relationship information between the recipient and the electronic device, and output the converted message.

According to an embodiment of the present disclosure, the memory 130 may further store instructions executed to enable the processor 120 to determine at least one voice variable for outputting the message based on the first relationship information and the second relationship information and convert the message according to the determined at least one voice variable. The voice variable may include at least one of a timbre, a pitch, a pause, a volume, and a velocity.

According to an embodiment of the present disclosure, the memory 130 may further store instructions executed to enable the processor 120 to determine at least one text generation variable for outputting the message based on the first relationship information and the second relationship information and convert the message according to the determined at least one text generation variable. The text generation variable may include at least one of an additional word, a job field word, a social relations word, a general word, a historical word, an emotional word, and a user specific word.

According to an embodiment of the present disclosure, the memory 130 may further store instructions executed to enable the processor 120 to determine at least one behavior variable for outputting the message based on the first relationship information and the second relationship information and convert the message according to the determined at least one behavior variable. The at least one behavior variable may include at least one of a display control, a driver control, and a connectivity control.

According to an embodiment of the present disclosure, the processor 120 may obtain third relationship information between the sender and the electronic device, and the memory 130 may further store instructions executed to enable the processor 120 to convert the message based on the first relationship information, the second relationship information, and the third relationship information.

According to an embodiment of the present disclosure, the memory 130 may further store instructions executed to enable the processor 120 to perform first conversion on the message to generate first text based on the first relationship information and generate second text based on the second relationship information to generate the converted message including the first text and the second text.

According to an embodiment of the present disclosure, the memory 130 may further store instructions executed to enable the processor 120 to determine a first attribute of an electronic device corresponding to the sender and the recipient and convert the message based on the first relationship information and fourth relationship information between the recipient and the first attribute.

According to an embodiment of the present disclosure, the memory 130 may store instructions executed to enable the processor 120 to identify a recipient of the message, determine at least one voice variable based on relationship information between the sender and the recipient and control the speaker to output the message according to the determined at least one voice variable.

According to an embodiment of the present disclosure, the communication interface 170 may perform communication with a plurality of other electronic devices. The memory 130 may store instructions executed to enable the processor 120 to generate a group chatting session between the plurality of other electronic devices, when the communication module receives a message through the group chatting session from a first electronic device of the plurality of other electronic devices, convert the received message according to user information corresponding to each of remaining electronic devices other than the first electronic device among the plurality of other electronic devices to generate a plurality of converted messages, and control the communication module to transmit each of the plurality of converted messages to each of the remaining electronic devices.

According to an embodiment of the present disclosure, the memory 130 may store instructions executed to enable the processor 120 to analyze a content of the message, convert the message using at least one of a voice determination variable, a text generation variable, and a behavior variable corresponding to the content, and perform control to output the converted message.

Figure 2A:
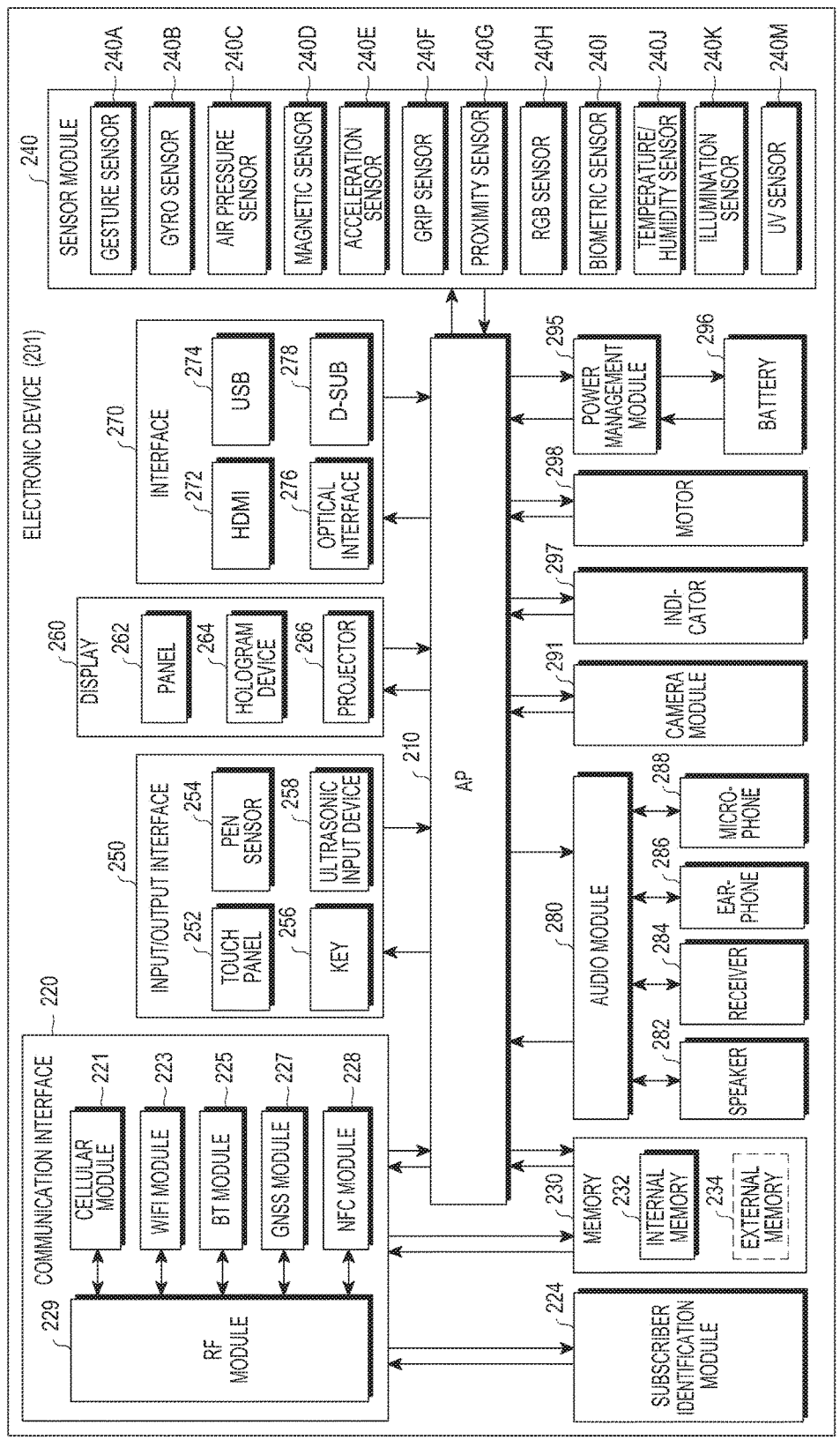
FIG. 2A is a block diagram illustrating an electronic device according to an embodiment of the present disclosure.

FIG. 2A is a block diagram illustrating an electronic device 201 according to an embodiment of the present disclosure. The electronic device 201 may include the whole or part of the configuration of, e.g., the electronic device 101 shown in FIGS. 1A and 1B.

Referring to FIG. 2A, the electronic device 201 may include one or more processors (e.g., APs) 210, a communication interface 220, a subscriber identification module (SIM) 224, a memory 230, a sensor module 240, an input/output interface 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphics processing unit (GPU) and/or an image signal processor (ISP). The processor 210 may include at least some (e.g., the cellular module 221) of the components shown in FIG. 2A. The processor 210 may load a command or data received from at least one of other components (e.g., a non-volatile memory) on a volatile memory, process the command or data, and store various data in the non-volatile memory.

The communication interface 220 may have the same or similar configuration to the communication interface 170 of FIGS. 1A and 1B. The communication interface 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP.

The Wi-Fi module 223, the Bluetooth module 225, the GNSS module 227, or the NFC module 228 may include a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module.

The SIM 224 may include, e.g., a card including a SIM and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 234 may include a flash drive, e.g., a compact flash (CF) memory, a secure digital (SD) memory, a micro-SD memory, a mini-SD memory, an extreme digital (xD) memory, a multi-media card (MMC), or a Memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a biometric sensor 240I, a temperature/humidity sensor 240J, an illumination sensor 240K, or an ultraviolet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 1601 may control the sensor module 240 while the processor 210 is in a sleep mode.

The input/output interface 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIGS. 1A and 1B. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be, for example, located inside or outside of the electronic device 201. In accordance with an embodiment, the display 260 may further include a control circuit to control the panel 262, the hologram device 264, or the projector 266.

The interface 270 may include e.g., a HDMI 272, a USB 274, an optical interface 276, or a D-subminiature (D-sub) 278. The interface 270 may be included in e.g., the communication interface 170 shown in FIGS. 1A and 1B. Additionally or alternatively, the interface 270 may include a mobile high-definition link (MHL) interface, an SD card/MMC interface, or IrDA standard interface.

The audio module 280 may convert a sound into an electric signal or vice versa, for example. At least a part of the audio module 280 may be included in e.g., the input/output interface 150 as shown in FIGS. 1A and 1B. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an ISP, or a flash such as an LED or xenon lamp.

The power management module 295 may manage power of the electronic device 201, for example. Although not shown, according to an embodiment of the present disclosure, the power management module 295 may include a power management IC (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile TV, such as a GPU may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 2B:
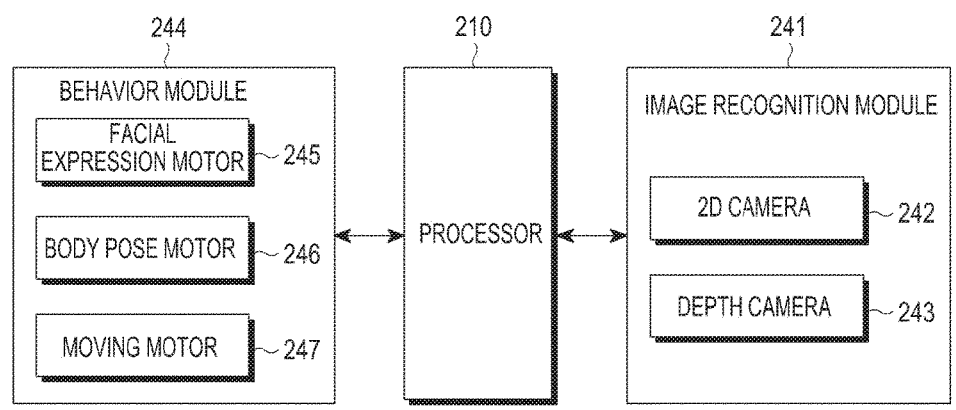
FIG. 2B is a block diagram illustrating an electronic device according to an embodiment of the present disclosure.

FIG. 2B is a block diagram illustrating an electronic device according to an embodiment of the present disclosure.

Referring to FIG. 2B, the processor 210 may be connected with an image recognition module 241. Further, the processor may be connected with a behavior module 244. The image recognition module 241 may include at least one of a 2-dimensional (2D) camera 242 and a depth camera 243. The image recognition module 241 may perform recognition based on a captured result and transfer the recognized result to the processor 210. The behavior module 244 may include at least one of a facial expression motor 245, a body pose motor 246, and a moving motor 247. The processor 210 may control at least one of the facial expression motor 245, the body pose motor 246, and the moving motor 247 to control the movement of the electronic device 101 implemented in the form of a robot. The electronic device 101 may include the elements shown in FIG. 2B in addition to the elements shown in FIG. 2A.

Figure 3:
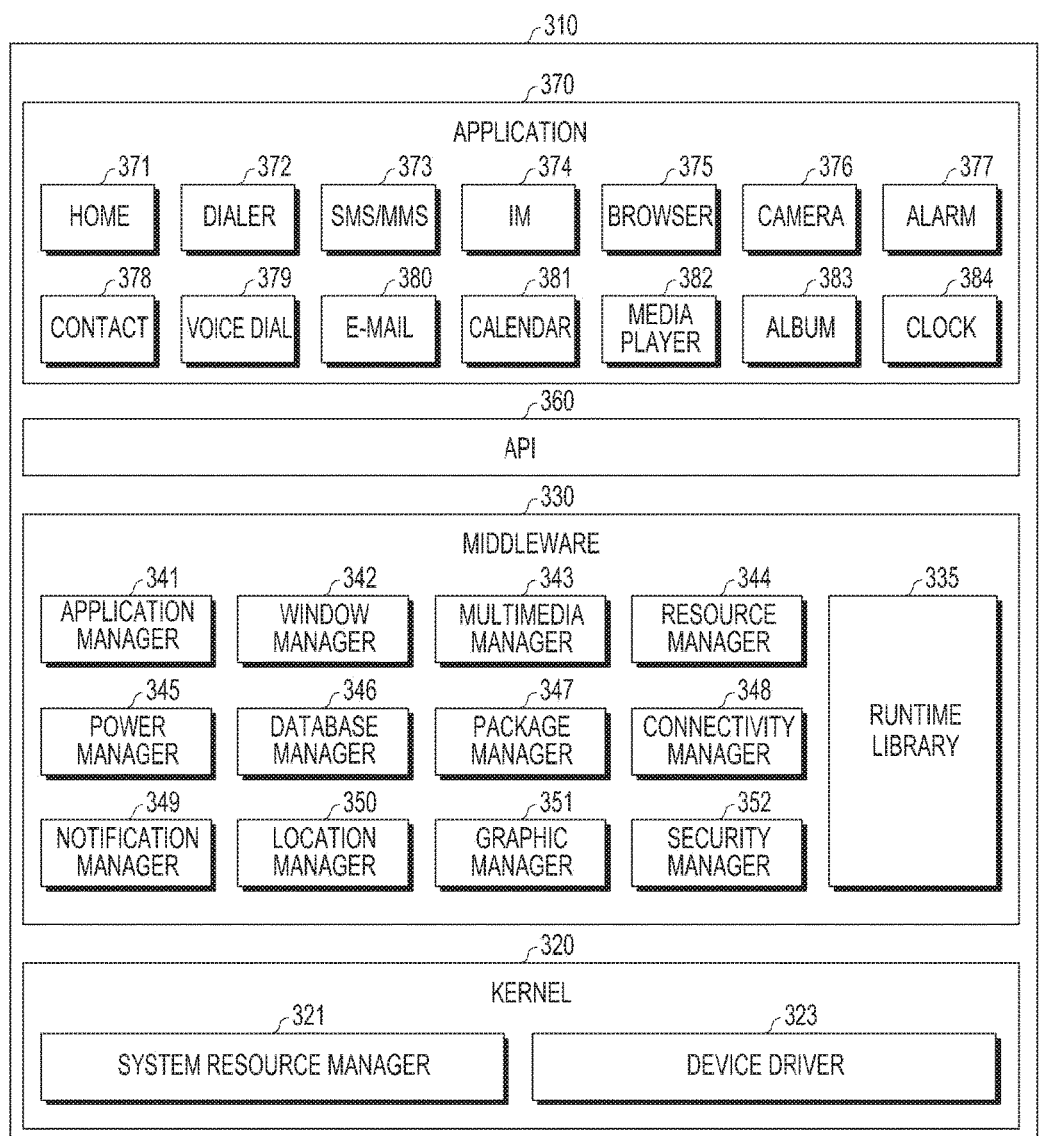
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, the program module 310 (e.g., the program 140) may include an OS controlling resources related to the electronic device (e.g., the electronic device 101) and/or various applications (e.g., the applications 147) driven on the OS. The OS may include, e.g., Android, iOS, Windows, Symbian, Tizen, or Bada.

The program module 310 may include, e.g., a kernel 320, middleware 330, an API 360, and/or an application 370. At least a part of the program module 310 may be preloaded on the electronic device or may be downloaded from an external electronic device (e.g., the electronic devices 102 and 104 or server 106).

The kernel 320 (e.g., the kernel 141) may include, e.g., a system resource manager 321 and/or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an embodiment of the present disclosure, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage graphical user interface (GUI) resources used on the screen. The multimedia manager 343 may grasp formats necessary to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related UI. The security manager 352 may provide various security functions necessary for system security or user authentication. According to an embodiment of the present disclosure, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the OS in order to provide a differentiated function. Further, the middleware 330 may dynamically omit some existing components or add new components.

The API 360 (e.g., the API 145) may be a set of, e.g., API programming functions and may have different configurations depending on OSs. For example, in the case of Android or iOS, one API set may be provided per platform, and in the case of Tizen, two or more API sets may be offered per platform.

The application 370 (e.g., the application 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an embodiment of the present disclosure, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 370 may include an application (e.g., a health-care application of a mobile medical device) designated according to an attribute of the external electronic device (e.g., the electronic devices 102 and 104). According to an embodiment of the present disclosure, the application 370 may include an application received from the external electronic device (e.g., the server 106 or electronic devices 102 and 104). According to an embodiment of the present disclosure, the application 370 may include a preloaded application or a third party application downloadable from a server. The names of the components of the program module 310 according to the shown embodiment may be varied depending on the type of OS.

Figure 4:
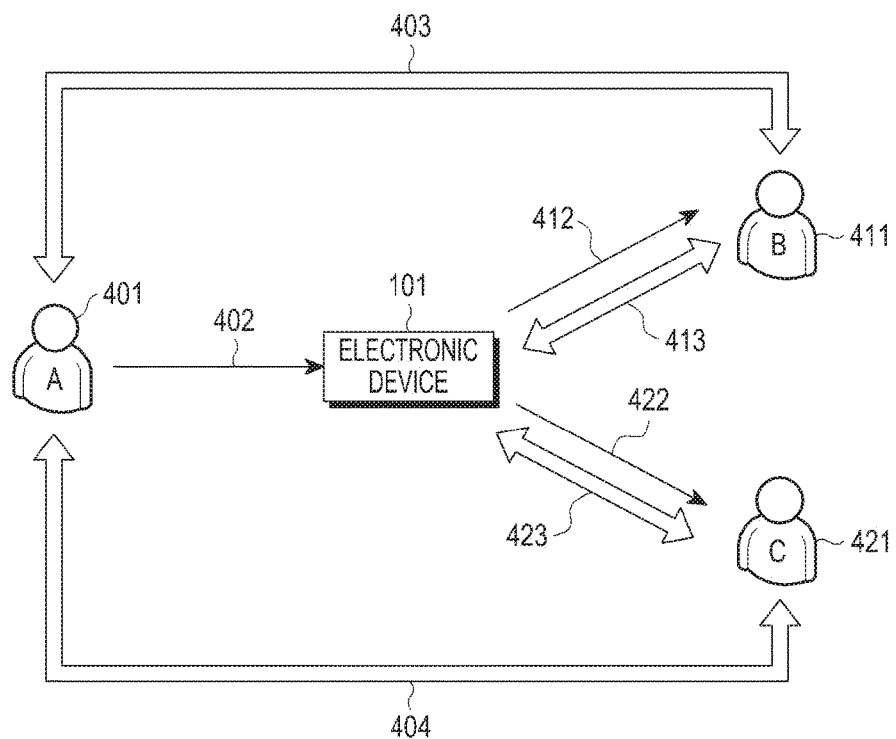
FIG. 4 is a concept view illustrating an operation of an electronic device according to an embodiment of the present disclosure.

FIG. 4 is a concept view illustrating an operation of an electronic device according to an embodiment of the present disclosure.

Referring to FIG. 4, the electronic device 101 may receive a message 402 from a sender A 401. In an embodiment, the electronic device 101 may receive a message from a transmitter used by the sender A 401. In this case, the electronic device 101 may receive the message from the transmitter in various communication schemes. The electronic device 101 may receive the message using a message communication application. In an embodiment, the electronic device 101 may receive the message form the sender A 401 in a voice. For example, the sender A 401 may speak out the message to the electronic device 101, and the electronic device 101 may obtain the message by converting the voice collected by the microphone into an electrical signal. The electronic device 101 may obtain the message from the converted electrical signal using various types of speech recognition applications.

The electronic device 101 may output the message to a first recipient B 411 and a second recipient C 421. In an embodiment, the electronic device 101 may transmit a message to a first receiver used by the first recipient B 411, and the electronic device 101 may transmit a message 422 to a second receiver used by the second recipient C 421. In this case, the electronic device 101 may transmit the messages 412 and 422 to the receivers in various communication schemes. The electronic device 101 may transmit the messages 412 and 422 using a message communication application. In an embodiment, the electronic device 101 may output the messages 412 and 422 in a voice to at least one of the first recipient B 411 and the second recipient C 421. For example, the electronic device 101 may synthesize the contents of the messages to output the messages 412 and 422 in a voice. There is no limitation on the way of synthesizing the contents of the messages by the electronic device 101.

The electronic device 101 may output the messages in a behavior besides the voice, which is described below in greater detail.

The electronic device 101 may convert the received message 402 and output converted messages 412 and 422. The electronic device 101 may identify first relationship information between the sender A 401 and the first recipient B 411. The electronic device 101 may identify third relationship information 404 between the sender A 401 and the second recipient C 421.

The electronic device 101 may previously configure and store the first relationship information 403 between the sender A 401 and the first recipient B 411 and the third relationship information 404 between the sender A 401 and the second recipient C 421 or configure them upon reception of the message 402. For example, the electronic device 101 may determine a recipient to receive the message and may obtain relationship information corresponding to the determined recipient. The electronic device 101 may identify second relationship information 413 between the first recipient B 411 and the electronic device 101. The electronic device 101 may previously configure and store fourth relationship information 423 between the second recipient C 421 and the electronic device 101 or configure it upon reception of the message 402.

When the electronic device 101 transfers a message to the first recipient B 411, the electronic device 101 may convert the received message 402 based on the first relationship information 403 between the sender A 401 and the first recipient B 411 and the second relationship information 413 between the first recipient B 411 and the electronic device 101. When the electronic device 101 transfers a message to the second recipient B 421, the electronic device 101 may convert the received message 402 based on the third relationship information 404 between the sender A 401 and the second recipient C 421 and the fourth relationship information 413 between the second recipient C 421 and the electronic device 101. The converted message 412 and the converted message 422 may differ from each other because they have been converted under different conditions.

Meanwhile, the electronic device 101 may configure various relationship information 403, 404, 413, and 423 according to information previously input to the electronic device 101. For example, the electronic device 101 may receive information indicating that the relationship between the sender A 401 and the first recipient B 411 is a romantic relationship and may configure the first relationship information 403 as the romantic relationship information according to the inputted information. Further, the electronic device 101 may receive information indicating that the first recipient B 411 is a superior, and the electronic device 101 is an inferior and may configure the second relationship information 413 as the superior-inferior relationship information according to the inputted information.

In an embodiment, when the electronic device 101 stores a message generated by the sender, the electronic device 101 may determine the relationship between the person having generated the message and a person to receive the message. Here, the electronic device 101 may previously store the relationship information or may study at least one or more information through a sensor to infer the relationship information. A result of inferring the relationship information may be created into a database and stored in a memory accessible by the electronic device 101.

According to an embodiment of the present disclosure, the electronic device 101 may manage a relationship matrix. The relationship matrix may be a matrix for the relationship between a recipient and the electronic device 101 and the relationship between a sender and a recipient and may store information regarding the relationship between the sender and the electronic device 101. For example, among relationships between a recipient and the electronic device 101, a friendship may reflect informal characteristics to the relationship matrix, a secretary relationship may reflect formal characteristics to the relationship matrix, and a romantic relationship may reflect emotional and romantic characteristics to the relationship matrix. Further, a celebrity's fad words, voice, or other features may also be reflected to the relationship matrix according to the user's settings. For the relationship between the recipient and the sender, when being a close relationship such as a family relationship or friendship, the appellation and message may be reprocessed, and when being a public relationship, the content may be generated to have polite words. Further, in a special relationship, pet names may be included between the recipient and the sender.

Further, although the message generated by the sender may be purported for a particular one only, it may also be for multiple ones. When the message is for multiple persons, the electronic device 101 may extract contents to be transferred, e.g., notice or schedule, from the message and may convert into other message according to the recipient detected by the sensor. According to an embodiment of the present disclosure, the electronic device 101 may extract the feature of the message including the contents. For example, the electronic device 101 may extract keywords of the message, emergency, and category of message contents.

The electronic device 101 may convert the message based on the configured first relationship information 403 and second relationship information 413. For example, the electronic device 101 may receive a message including the content "I'll be late today." The electronic device 101 may convert the content "I'll be late today" into the content "Honey, I'll be late today" based on the first relationship information 403. That is, the electronic device 101 may add words, such as "Honey," corresponding to the romantic relationship that is the first relationship information 403. Or, the electronic device 101 may add words corresponding to the romantic relationship to the words "11 be late" to make it sound more lovely. The electronic device 101 may convert the verb in the content into its base form and then modify the base form of the verb based on the relationship information. For example, the electronic device 101 may add a word corresponding to the relationship information to the base form of verb. The electronic device 101 may previously store association information on additional words or suffixes corresponding to the relationship information and a conversion algorithm and may convert the message using the stored association information and conversion algorithm. Further, the electronic device 101 may perform second conversion based on the second relationship information 413. For example, the electronic device 101 may further convert the first converted message "Honey, I'll be late today" into a message saying "Sir, you have a message from person A saying "Honey, I'll be late today."

Meanwhile, the electronic device 101 may convert the message based on the configured third relationship information 404 and fourth relationship information 423. For example, it is assumed that the third relationship information 404 is about a father-son relationship, and the fourth relationship information 423 is about a relationship. The electronic device 101 may receive a message including the content "I'll be late today." The electronic device 101 may convert the content "I'll be late today" into the content "Daddy will be late today" based on the third relationship information 404. In other words, the electronic device 101 may convert "I" into "Daddy" corresponding to the father-son relationship that is of the third relationship information 404. Or, the electronic device 101 may add a word corresponding to the father-son relationship to the words "11 be late." The electronic device 101 may convert the verb in the content into its base form and then modify the base form of verb corresponding to the relationship information. The electronic device 101 may previously store association information on the modified word or suffix corresponding to the relationship information and a conversion algorithm and may convert the message using the stored association information and conversion algorithm. Further, the electronic device 101 may perform second conversion based on the second relationship information 413. The electronic device 101 may further convert the first converted message "Daddy will be late today" into a message saying "Buddy, you have a message from person A saying "Daddy will be late today." In an embodiment, the electronic device 101 may add a word corresponding to the relationship information.

As described above, the electronic device 101 may output the message differently converted depending on various relationships, and accordingly, the electronic device 101 may provide such a service as if the electronic device 101 becomes a human being.

Meanwhile, the grasp of relationship information through an input as set forth above is merely an example, and according to an embodiment of the present disclosure, the electronic device 101 may configure the relationship information in various ways.

The electronic device 101 may gather various information related to the sender A 401, the first recipient B 411, and the second recipient C 421 and may analyze the gathered information to configure various relationship information 403, 404, 413, and 423. For example, the electronic device 101 may capture a gesture of the sender A 401 and may analyze the gesture according to the captured result. The electronic device 101 may determine that the sender A 401 has made a gesture of stroking the first recipient B 411 and in this case may determine that a gesture classified as intimacy has been conducted. The electronic device 101 may set the first relationship information 403 between the sender A 401 and the electronic device 101 as romantic relationship information according to the gathered information, i.e., the gesture.

Or, the electronic device 101 may gather information in other various manners other than the image capturing, such as message analysis, speech recognition, web analysis, etc., to set the relationship information 403, 404, 413, and 423. Table 1 is an example of information used for setting the relationship information 403, 404, 413, and 423 according to an embodiment of the present disclosure.

TABLE 1

| Relationship information determination references | Relationship information determination methods |
| --- | --- |
| Gesture | The electronic device 101 may determine a relationship through a gesture between users. |
| Face | The electronic device 101 may register a relationship according to a face recognition upon initial setup and later determine a relationship according to the face recognized by a captured result. |
| Body language | The electronic device 101 may grasp the relationship between users according to the body language primarily used by the users. |
| Speech recognition | The electronic device 101 may determine the relationship according to speech recognition. For example, the electronic device 101 may determine the relationship by name. |
| Inter-person distance | The electronic device 101 may determine the intimacy according to an inter-person distance. |
| Relationship frequency | The electronic device 101 may determine the intimacy according to the frequency discovered in an image frame obtained as the captured result. |
| Address book | The electronic device 101 may grasp the relationship between the users by grasping the relationship information recorded in at least one accessible address book. |
| SNS information | The electronic device 101 may grasp the relationship between the users by analyzing accessible social networking service (SNS) data. |
| Inquiry-answer information | The electronic device 101 may inquire the user about relationship information and may grasp the relationship information according to the answer thereto. |
| Context information | The electronic device 101 may grasp the relationship information according to the contents in the message. |
| Place | The electronic device 101 may grasp the relationship information according to where the message is transmitted or received. |
| Time | The electronic device 101 may grasp the relationship information according to when the message is created and received. |

As described above, the electronic device 101 may grasp the relationship between persons according to various references to configure it previously or at the time of communication of the message.

Meanwhile, the above-described romantic relationship, father-son relationship, and superior-inferior relationship are merely an example, and according to an embodiment of the present disclosure, the electronic device 101 may configure various relationship information between, e.g., family members, friends, superior and inferior, boss and secretary, lovers, and strangers. The electronic device 101 may differentiate the relationship information according to the degree of intimacy and quantify and manage the relationship information.

The electronic device 101 may study and configure the relationship information or may reconfigure and update the relationship information.

As described above, the electronic device 101 may convert a message based on the relationship information between the recipient and the sender and the relationship information between the recipient and the electronic device 101, enabling the electronic device 101 to be anthropomorphized to transfer the message.

Figure 5A:
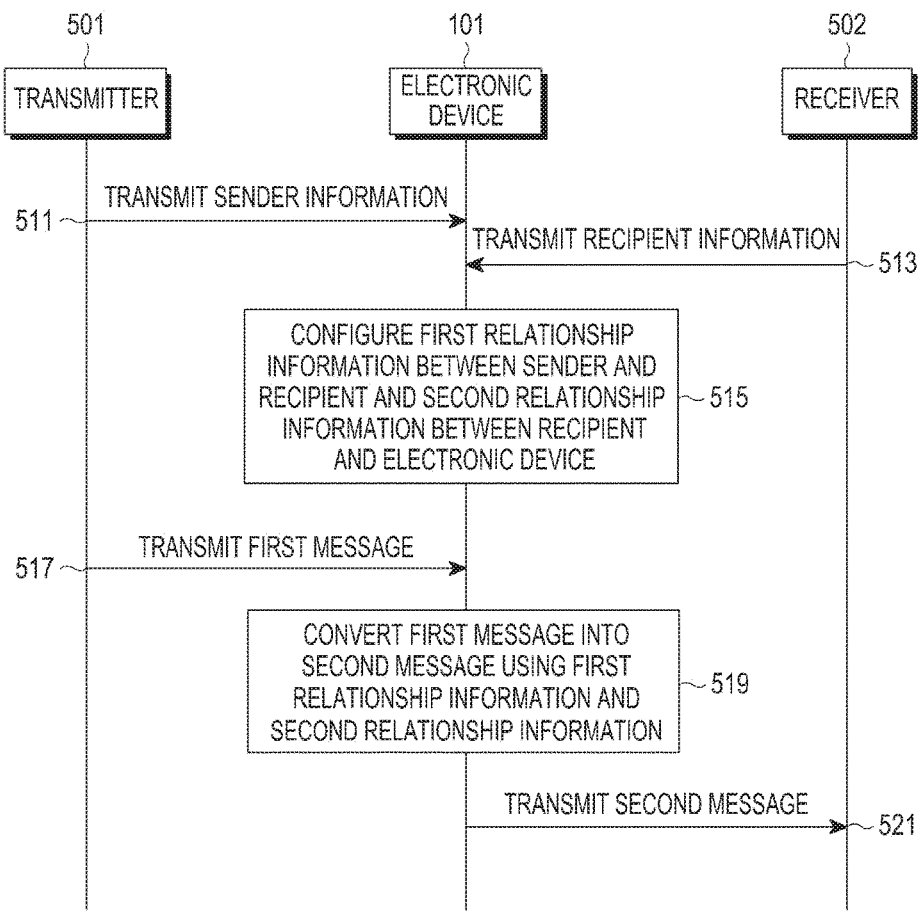
FIGS. 5A and 5B are flowcharts illustrating a method for controlling an electronic device according to various embodiments of the present disclosure.
Figure 5B:
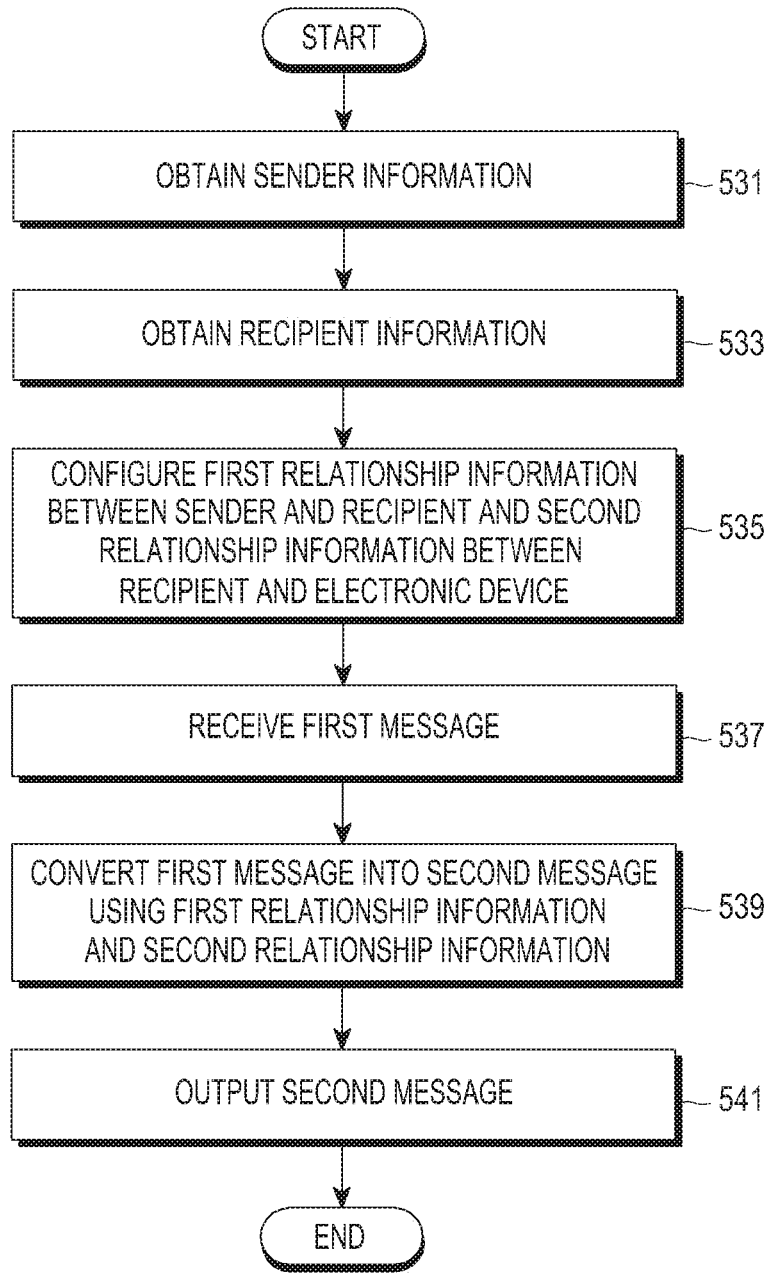

FIGS. 5A and 5B are flowcharts illustrating a method for controlling an electronic device according to various embodiments of the present disclosure.

Referring to FIG. 5A, in operation 511, the transmitter 501 may transmit information regarding a sender to the electronic device 101. In operation 513, the receiver 502 may transmit information regarding a recipient to the electronic device 101.

In operation 515, the electronic device 101 may configure first relationship information between the sender and the recipient based on the sender information and the recipient information. Further, the electronic device 101 may configure second relationship information between the recipient and the electronic device based on the recipient information. The sender information and the recipient information each may include various references enabling the configuration of relationship information as set forth in Table 1. Or, each of the sender information and the recipient information may further include at least one of voice font, content, personal information (e.g., profile), emotional information, and preference information. The electronic device 101 may configure the first relationship information using the obtained sender information and recipient information. The electronic device 101 may determine the attribute of the electronic device 101 and may configure the second relationship information using the attribute of the electronic device 101 and the recipient information.

The attribute of the electronic device 101 may be, e.g., friend, secretary, sibling, parent, worker in particular job, or child.

In operation 517, the transmitter 501 may transmit a first message to the electronic device 101. Although FIG. 5A illustrates that the transmitter 501 directly transmits the first message to the electronic device 101, this is merely an example, and there may be at least one electronic device relaying the first message between the transmitter 501 and the electronic device 101.

In operation 519, the electronic device 101 may convert the first message into a second message using the first relationship information and the second relationship information. For example, the electronic device 101 may first convert the message using the first relationship information, and may second convert the first converted message using the second relationship information to generate a second message. For example, the electronic device 101 may convert the content of the first message using the first relationship information and the second relationship information.

In operation 521, the electronic device 101 may transmit the second message to the receiver 502.

FIG. 5B is a flowchart illustrating a method for controlling an electronic device according to an embodiment of the present disclosure.

Referring to FIG. 5B, in operation 531, the electronic device 101 may obtain the sender information. The electronic device 101 may obtain the sender information from the transmitter 501 as described in connection with FIG. 5A or in other various manners. For example, the electronic device 101 may obtain various conditions for configuring the relationship information as shown in Table 1, in various ways, such as image capturing, message reception, information reception from the web, or information entry from outside.

In operation 533, the electronic device 101 may obtain the recipient information. The electronic device 101 may obtain the sender information from the receiver 502 as described in connection with FIG. 5A or in other various manners. For example, the electronic device 101 may obtain various conditions for configuring the relationship information as shown in Table 1, in various ways, such as image capturing, message reception, information reception from the web, or information entry from outside.

In operation 535, the electronic device 101 may configure the first relationship information between the sender and the recipient and the second relationship information between the recipient and the electronic device. In operation 537, the electronic device 101 may receive the first message. The electronic device 101 may receive the first message from the transmitter 501 as shown in FIG. 5A or may obtain a message in the form of a voice through the microphone. Or, the electronic device 101 may obtain the message by analyzing the image obtained through the camera.

In operation 539, the electronic device 101 may convert the first message into a second message using the first relationship information and the second relationship information. In operation 541, the electronic device 101 may output the second message. As shown in FIG. 5A, the electronic device 101 may transmit the second message to the receiver 502 or may output the message through the speaker or display in an audible or visual manner.

Figure 6:
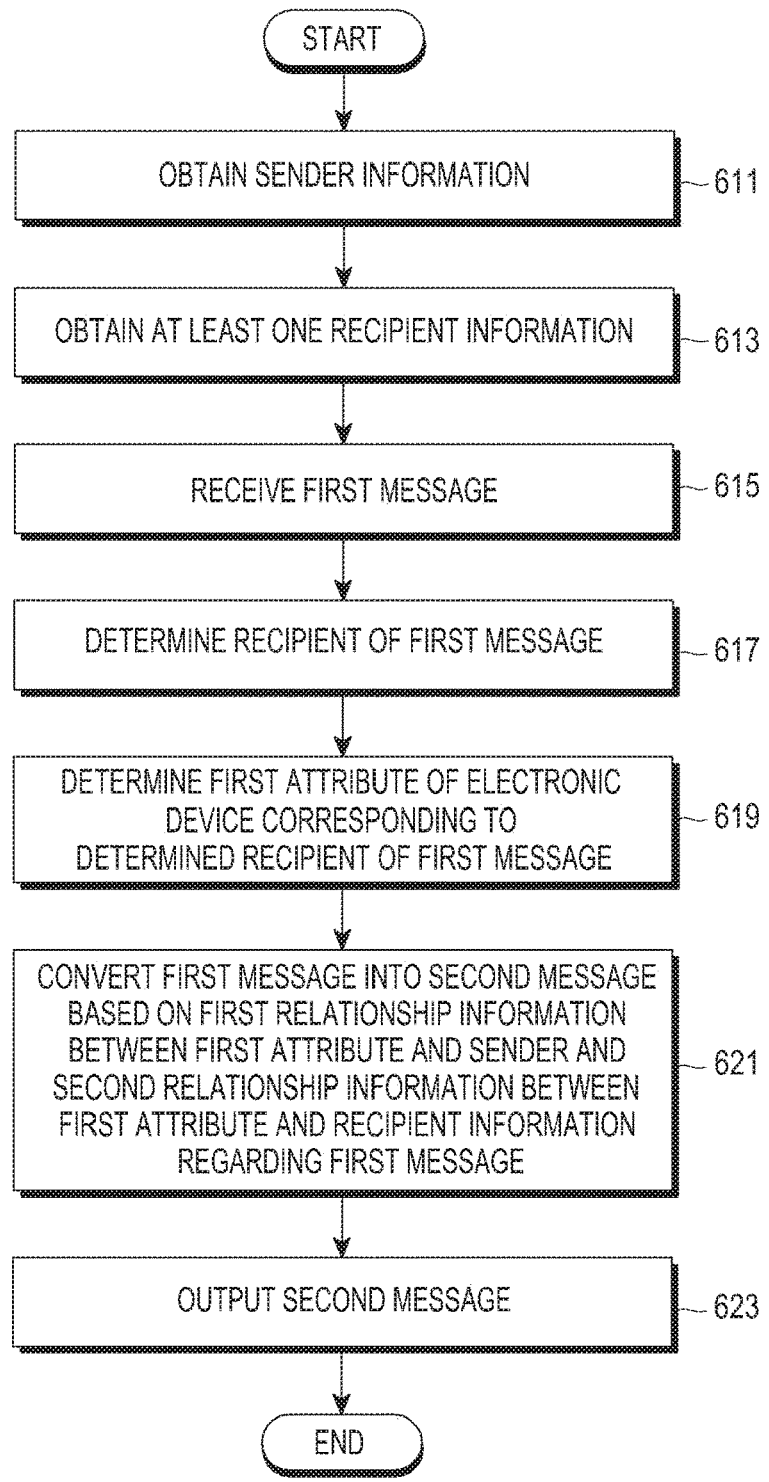
FIG. 6 is a flowchart illustrating a method for controlling an electronic device according to an embodiment of the present disclosure.

FIG. 6 is a flowchart illustrating a method for controlling an electronic device according to an embodiment of the present disclosure.

Referring to FIG. 6, in operation 611, the electronic device 101 may obtain the sender information. In operation 613, the electronic device 101 may obtain information on at least one recipient. As described above, the electronic device 101 may obtain the sender information and the recipient information in various ways such as reception from other electronic device, image capturing, input, or gathering through the web.

In operation 615, the electronic device 101 may obtain the first message. In operation 617, the recipient of the first message may be determined. Here, the recipient of the first message may be a single or multiple persons. The electronic device 101 may determine the recipient of the first message by analyzing the first message. In an embodiment, the first message may include the recipient information. For example, when the first message is a message by a text message communication application, it may include the information on the recipient, and the electronic device 101 may obtain the information on the recipient included in the first message. The electronic device 101 may first obtain identification information on the recipient, such as an identifier on the text message communication application or a phone number and may obtain the recipient information stored corresponding to the identification information. Or, the electronic device 101 may determine the recipient by analyzing the contents in the first message. For example, the electronic device 101 may parse the text corresponding to the name in the contents and may determine the recipient corresponding to the parsed text. Or, the electronic device 101 may determine the recipient using the place where the first message is received. For example, the electronic device 101 may determine the place where the first message is received is "home" through message analysis and may determine that a person stored to be resident at "home" is the recipient. Or, when the first message does not designate a particular recipient, the electronic device 101 may determine the person recognized by capturing the external environment is the recipient.

In operation 619, the electronic device 101 may determine a first attribute of the electronic device corresponding to the determined recipient of the first message. According to an embodiment of the present disclosure, the electronic device 101 may determine at least one attribute. Here, the attribute of the electronic device 101 may be a status in a relative relationship with the sender or the recipient. For example, it is assumed that the electronic device 101 determines that the recipient is the first recipient B 411 as shown in FIG. 4. The electronic device 101 may determine that the attribute of the electronic device 101 corresponding to the first recipient B 411 is the inferior in the superior-inferior relationship. Or, when the electronic device 101 determines that the recipient is the second recipient C 421 as shown in FIG. 4, the electronic device 101 may determine that the attribute of the electronic device 101 corresponding to the second recipient C 421 is friend. That is, the electronic device 101 may determine different attributes of the electronic device 101 corresponding to the determined recipient.

According to an embodiment of the present disclosure, the electronic device 101 may previously store at least one attribute. For example, the electronic device 101 may previously store various attributes, such as friend, superior or inferior in the superior-inferior relationship, father, mother, son, daughter, or grandchild. The electronic device 101 may determine the attribute corresponding to the determined recipient from among at least one attribute. The electronic device 101 may previously store the association information between the recipient and the attribute and may determine the attribute corresponding to the recipient based on the pre-stored association information. Or, the electronic device 101 may determine the attribute corresponding to the recipient identified based on a preset algorithm. The electronic device 101 may update the pre-stored association information according to the information obtained in various ways, such as analysis of captured result, input from outside, voice interaction, or information gathering from the web.

In operation 621, the electronic device 101 may convert the first message into the second message based on the first relationship information between the first attribute and the sender and the second relationship information between the first attribute and the information on the recipient of the first message. In operation 623, the electronic device 101 may output the converted second message. Accordingly, the electronic device 101 may perform message conversion, with a per-recipient corresponding attribute reflected.

Figure 7:
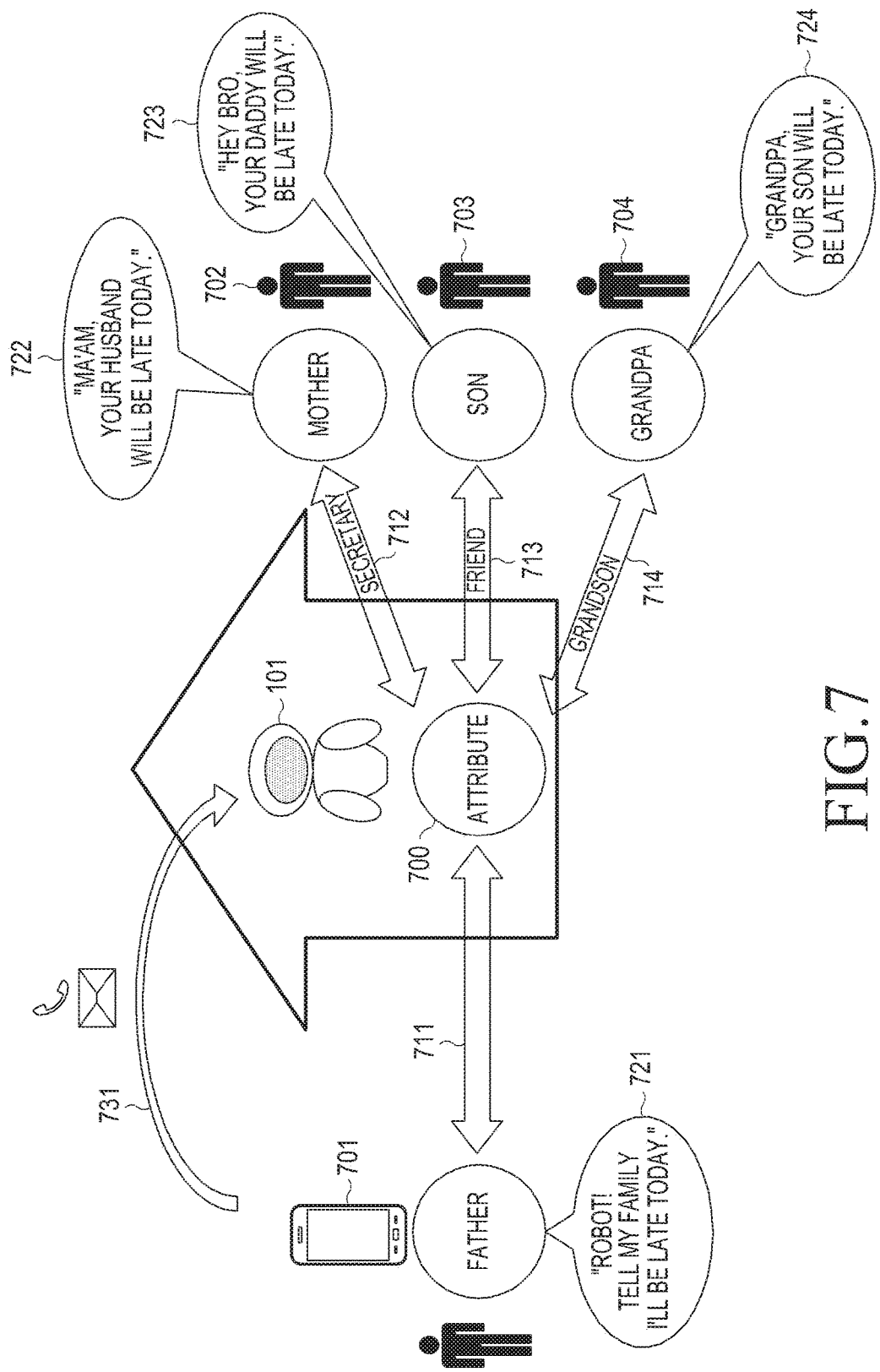
FIG. 7 is a concept view illustrating an operation of an electronic device according to an embodiment of the present disclosure.

FIG. 7 is a concept view illustrating an operation of an electronic device according to an embodiment of the present disclosure.

Referring to FIG. 7, the electronic device 101 may transfer a message to at least one recipient 702, 703, and 704 in, e.g., a home. The electronic device 101 may transfer the message in a visual or audible manner through the speaker or display to the at least one recipient 702, 703, and 704. Or, the electronic device 101 may transmit the message to the receiver used by the at least one recipient 702, 703, and 704.

Meanwhile, the electronic device 101 may receive the message 731 from the sender 701. The message 731 may be a message by a text communication application or a voice message through a call. In the embodiment shown in FIG. 7, the content 721 of the message is "Robot, tell my family that I'll be late today." The electronic device 101 may receive the content 721—containing message through communication. Or, the electronic device 101 may obtain a voice including the content 721.

For example, when the family members of the sender 701, i.e., recipients 702, 703, and 704, are not in the same place at the same time zone, the electronic device 101, when generating a message for at least one or more recipients, should currently leave a memo or transfer the message to each recipient for persons for which the message is to be transferred. For example, the sender 701 may generate a call or a message, e.g., an SNS or SMS message, and may transfer it to the devices of the recipients 702, 703, and 704 to perform communication with the recipients 702, 703, and 704.

The sender 701 may generate and transfer 711 a message for at least one or more recipients 702, 703, and 704 through the electronic device 101. The sender 701 may input an input to be transferred to the electronic device 101 through at least one or more input methods among voice, vision, and gesture. As an example of generating the message through voice input, the sender 701, when required to inform other family members of the purpose and time of going out while nobody is home, may input a message saying "I'll be late today" to the electronic device 101.

The electronic device 101 may determine the recipient of the received message 731. The electronic device 101 may determine the recipient according to the recipient information included in the message 731. For example, in the embodiment shown in FIG. 7, the sender 701 has transmitted the message 731 to the electronic device 101 included in the home network, and accordingly, the electronic device 101 may determine the family members corresponding to the home network as recipients. Or, the electronic device 101 may determine a recipient by analyzing the content 721 of the message 731. The electronic device 101 may determine that the "family" which is the word coupled with the preposition, e.g., "to," corresponding to the recipient is the recipients. The electronic device 101 may determine that the mother 702, the son 703, and the grandfather 704 corresponding to the "family" are the recipients. Or, the electronic device 101 may recognize the face of the sender 701 and store the message generated from the sender 701, and the electronic device 101 may determine and store the recipient of the received message. Upon determining that the corresponding message is information necessary for persons within a particular relationship with the sender 701, when, after the sender 701 is out, the presence of a new recipient is grasped, and a message needs to be transferred to the recipient, the message may be output. For example, the electronic device 101 may output the message as the recipient is detected or at the request of the recipient. When there are a plurality of recipients of the message, the electronic device 101 may output the message upon identifying the recipient through the sensor.

The electronic device 101 may determine the attribute 700 of the electronic device 101 corresponding to the determined recipients, i.e., the mother 702, the son 703, and the grandfather 704. The electronic device 101 may determine the attribute 700 of the secretary 712 corresponding to the recipient of the mother 702. The electronic device 101 may determine the attribute 700 of the friend 713 corresponding to the recipient of the son 703. The electronic device 101 may determine the attribute 700 of the grandson 714 corresponding to the recipient of the grandfather 704.

The electronic device 101 may convert the received message based on the relationship information between the determined attribute 700 and the recipient and the relationship information between the sender and the recipient. The electronic device 101 may generate a converted message 722 based on the relationship information between the attribute 700 of secretary 712 and the recipient of the mother 702 and the relationship information between the sender, i.e., the father, and the recipient of the mother 702. The electronic device 101 may parse the content "I'll be late today" which is to be transferred from the received message 731. The electronic device 101 may determine that the word, e.g., "Robot," corresponding to the attribute 700 of the electronic device 101 as its name and may exclude it from the contents. Further, the electronic device 101 may determine the words "to family" associated with the preposition "to" are words for determining the recipient and may exclude them from the contents. Further, the electronic device 101 may determine the word "say" is of an operation that should be performed by the electronic device 101 and may exclude it from the contents. The electronic device 101 may perform an operation of transferring the message, may previously store forwarding-related words, such as "say," "tell," and "send," as words instructing operation and may exclude words corresponding thereto from the contents. The electronic device 101 may parse the content "I'll be late today" form the message received through the stored algorithm as described above.

The electronic device 101 may convert the content "I'll be late today" which intends to be transferred based on the relationship information between the sender, i.e., the father, and the recipient of the mother 702 into "Husband will be late today." The electronic device 101 may convert the word corresponding to the subject, i.e., "I," into the word "Husband" based on the relationship information between the sender, i.e., the father, and the recipient of the mother 702. The electronic device 101 may previously store the words "I" and "You" corresponding to the subject and may identify them from the message and convert the same. The electronic device 101 may convert the subject "I" into "Husband" that is the appellation on the recipient part corresponding to the subject on the relationship information. The appellation on the recipient part corresponding to the subject may be previously stored.

The electronic device 101 may convert the first converted content "Husband will be late today" into "Ma'am, your husband will be late today" based on the relationship information between the electronic device 101 and the recipient of the mother 702. The electronic device 101 may add an appellation "Ma'am" corresponding to the attribute 700 corresponding to the recipient of the mother 702, i.e., secretary 712, and may convert "will be late" into words expressing in more respectful manner.

The electronic device 101 may output the converted message "Ma'am your husband will be late today." The electronic device 101 may transmit the message to the electronic device of the mother 702. Or, when the mother 702 is nearby, the electronic device 101 may audibly or visually output the message through the speaker or display. Or, the electronic device 101 may move to the determined recipient and audibly or visually output the message.

The electronic device 101 may convert the content to be transferred, i.e., "I'll be late today," into "Daddy will be late today" based on the relationship information between the sender, i.e., the father, and the recipient of the son 703. The electronic device 101 may convert the word corresponding to the subject, i.e., "I," into the word "Daddy" based on the relationship information between the sender, i.e., the father, and the recipient of the son 703. The electronic device 101 may previously store the words "I" and "You" corresponding to the subject and may identify them from the message and convert the same. The electronic device 101 may convert the subject "I" into "Daddy" that is the appellation on the recipient part corresponding to the subject on the relationship information. The appellation on the recipient part corresponding to the subject may be previously stored.

The electronic device 101 may convert the first converted message "Daddy will be late today" into "Hey bro, your daddy will be late today." 723 based on the relationship information between the electronic device 101 and the recipient of the son 703. The electronic device 101 may add the words "Hey, Bro" while converting "Daddy will be late" into "Your daddy will be late" corresponding to the attribute 700 corresponding to the recipient of the son 703, i.e., friend 713.

The electronic device 101 may output the converted message "Hey bro, your daddy will be late today." The electronic device 101 may transmit the message to the electronic device of the son 703. Or, when the son 703 is nearby, the electronic device 101 may audibly or visually output the message through the speaker or display. Or, the electronic device 101 may move to the determined recipient and audibly or visually output the message.

The electronic device 101 may convert the content "I'll be late today" which intends to be transferred based on the relationship information between the sender, i.e., the father, and the recipient of the grandfather 704 into "Son will be late today." The electronic device 101 may convert the word corresponding to the subject, i.e., "I," into the word "Son" based on the relationship information between the sender, i.e., the father, and the recipient of the grandfather 704. The electronic device 101 may previously store the words "I" and "You" corresponding to the subject and may identify them from the message and convert the same. The electronic device 101 may convert the subject "I" into "Son" that is the appellation on the recipient part corresponding to the subject on the relationship information. The appellation on the recipient part corresponding to the subject may be previously stored.

The electronic device 101 may convert the first converted content "Son will be late today" into "Grandfather, son will be late today" 724 based on the relationship information between the electronic device 101 and the recipient of the grandfather 704. The electronic device 101 may add the appellation "Grandfather" while converting "will be late" into words expressing in a more respectful manner, corresponding to the attribute 700 corresponding to the recipient of the grandfather 704, i.e., grandson 714.

The electronic device 101 may output the converted message "Grandfather, son will be late today." The electronic device 101 may transmit the message to the electronic device of the grandfather 704. Or, when the grandfather 704 is nearby, the electronic device 101 may audibly or visually output the message through the speaker or display. Or, the electronic device 101 may move to the determined recipient and audibly or visually output the message.

As set forth above, the electronic device 101 may determine the attribute 700 per determined recipient and may perform different message conversions accordingly.

Alternatively, the electronic device 101 may directly transfer the message from the sender in the form of quoting the content in the message. For example, the electronic device 101 may generate a converted message saying "Hey bro, daddy said that he's late today" to the son 703 in the form of quoting the content "I'll be late today" which is to be transferred.

Meanwhile, the electronic device 101 may store a relationship map for who are family members according to initial registration, and alternatively, the electronic device 101 may determine what family members constitute a household through at least one or more sensors positioned in the household. For example, the electronic device 101 may study the family members through a gesture and conversation between the family members while in operation to form the family relationship map and may utilize the individual electronic devices of the family members to use the same as information to study the relationship. For example, the electronic device 101 may create a relationship map between the family members using at least one or more information (registered name, picture, SNS relationship, and appellation) in the address book by communicating with the individual smartphone of the mother 702 and store the relationship map in the memory. Here, the memory may be positioned inside the electronic device 101 or in other various types of electronic devices accessible by the electronic device 101. Further, the electronic device 101 may define the relationship between the electronic device 101 and each family member. In this case, each family member may define the relationship as he/she configures an interaction method with the electronic device 101, and the initially configured relationship may be reset by the frequency of interaction or interaction methods. For example, the mother 702 may want to be treated as owner receiving service upon interacting with the electronic device 101. Here, the electronic device 101 may interact with the mother 702 using formal or respectful words. Further, the son 703 may set the relationship with the electronic device 101 as close friend or brother, and in this case, the electronic device 101 may interact using different words and phrases from those the electronic device 101 uses when interacting with the mother 702.

Figure 8:
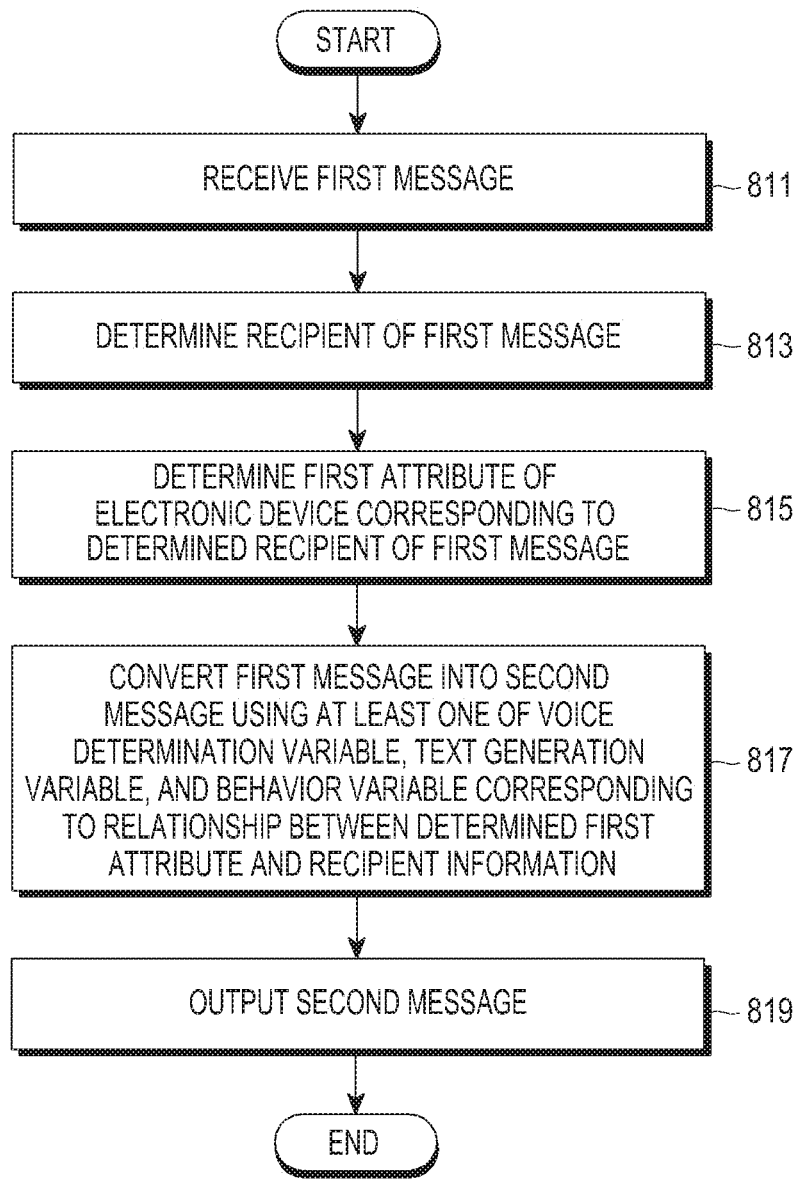
FIG. 8 is a flowchart illustrating a method for controlling an electronic device according to an embodiment of the present disclosure.

FIG. 8 is a flowchart illustrating a method for controlling an electronic device according to an embodiment of the present disclosure.

Referring to FIG. 8, in operation 811, the electronic device 101 may obtain the first message. In operation 813, the electronic device 101 may determine a recipient of the first message. In operation 815, the electronic device 101 may determine a first attribute of the electronic device 101 corresponding to the determined recipient of the first message.

In operation 817, the electronic device 101 may convert the first message into a second message using at least one of a voice determination variable, a text generation variable, and a behavior variable corresponding to the relationship between the determined first attribute and the recipient information.

In operation 819, the electronic device 101 may output the second message. Accordingly, the electronic device 101 may text-convert or output the first text through various output means, such as the gesture, haptic, fragrance, image (the sender's face or recent picture of sender-recipient), or emoticon (hilarious, surprised, furious, sad, or other characters) corresponding to the second message.

Figure 9A:
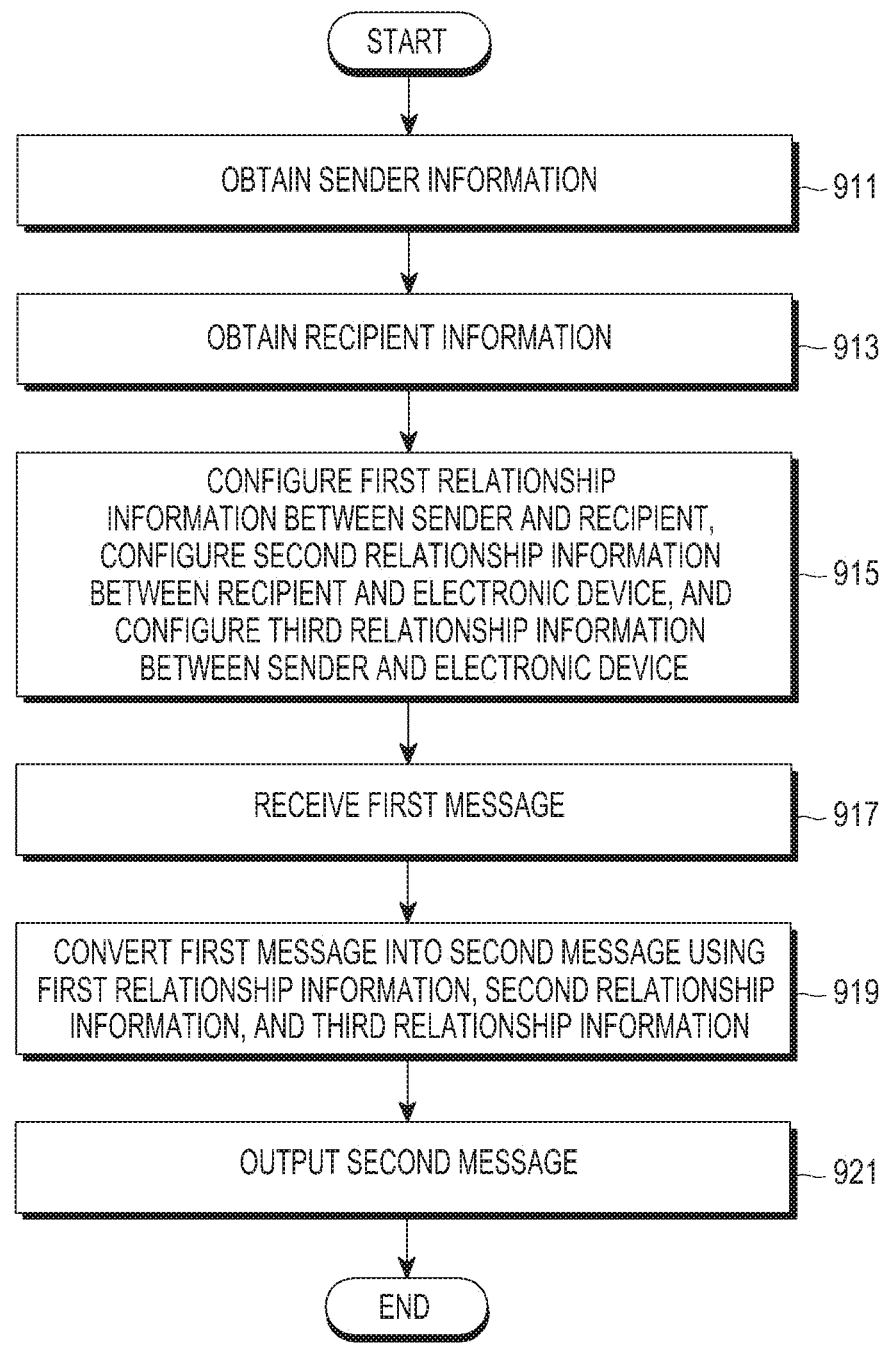
FIG. 9A is a flowchart illustrating a method for controlling an electronic device according to an embodiment of the present disclosure.

FIG. 9A is a flowchart illustrating a method for controlling an electronic device according to an embodiment of the present disclosure.

Referring to FIG. 9A, in operation 911, the electronic device 101 may obtain the sender information. In operation 913, the electronic device 101 may obtain the recipient information. In operation 915, the electronic device 101 may configure first relationship information between the sender and the recipient, second relationship information between the recipient and the electronic device, and third relationship information between the sender and the electronic device. The third relationship information 405 may be relationship information between the sender A 401 and the electronic device 101 as shown in FIG. 9B.

Figure 9B:
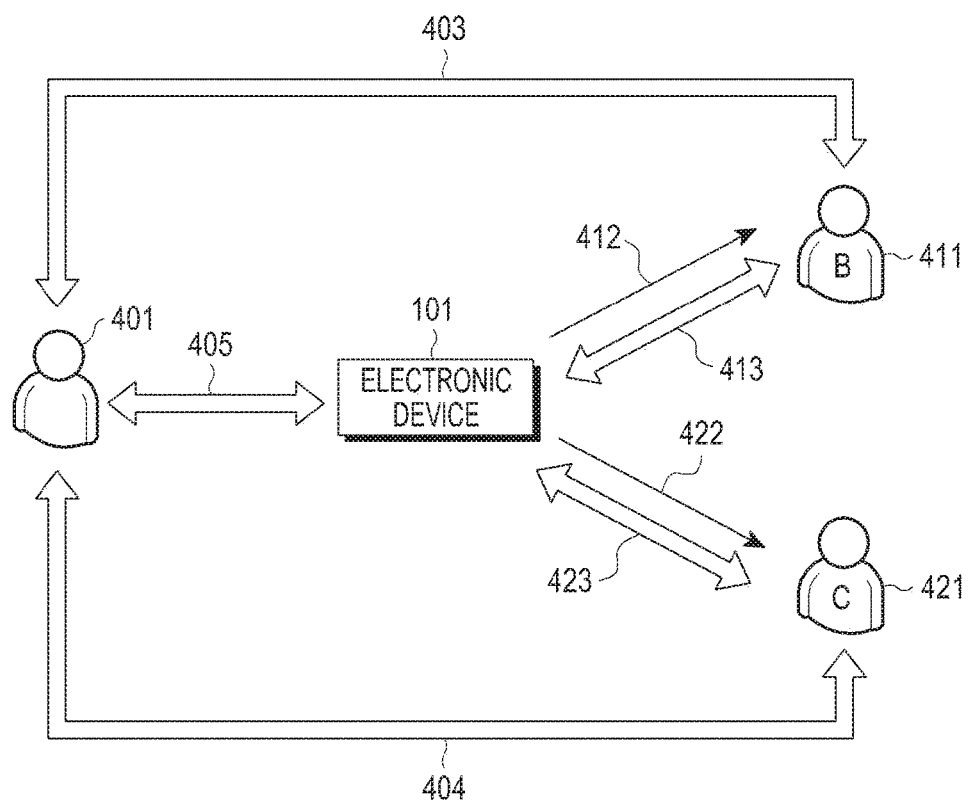
FIG. 9B is a concept view illustrating an operation of an electronic device according to an embodiment of the present disclosure.

FIG. 9B is a concept view illustrating an operation of an electronic device according to an embodiment of the present disclosure.

In an embodiment, the electronic device 101 may determine the first attribute of the electronic device 101 corresponding to the recipient. The electronic device 101 may configure the second relationship information using the first attribute. The electronic device 101 may determine the second attribute of the electronic device 101 corresponding to the sender. The electronic device 101 may configure the third relationship information using the second attribute. For example, when the recipient is the "mother" as shown in FIG. 6, the electronic device 101 may determine that the first attribute is "secretary." Further, when the sender is the "father" as shown in FIG. 6, the electronic device 101 may determine that the second attribute is "friend."

In operation 917, the electronic device 101 may receive the first message. In operation 919, the electronic device 101 may convert the first message into a second message using the first relationship information, the second relationship information, and the third relationship information. For example, as shown in FIG. 6, the electronic device 101 may third convert the converted message "Ma'am, your husband will be late today" into "Ma'am, Mr. Kim will be late today" based on the third relationship information. In other words, the electronic device 101 may convert the appellation "Husband" into the appellation of the sender, "Mr. Kim," in terms of the attribute of the electronic device 101 based on the third relationship information.

In operation 921, the electronic device 101 may output the converted second message.

Figure 10:
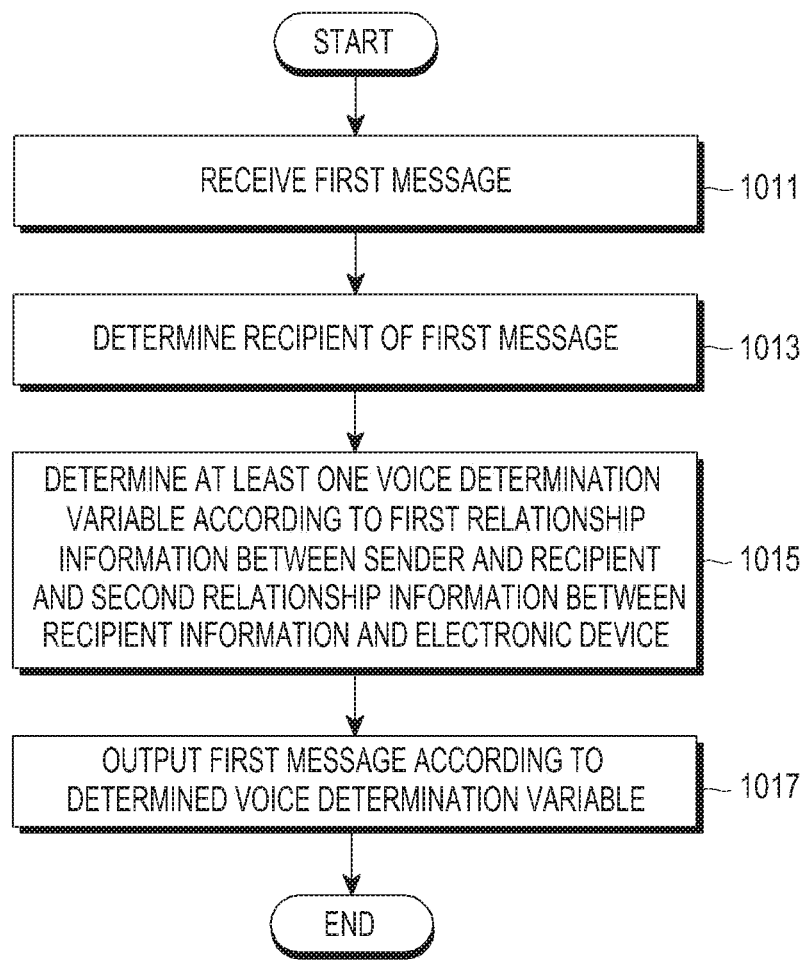
FIG. 10 is a flowchart illustrating a method for controlling an electronic device according to an embodiment of the present disclosure.

FIG. 10 is a flowchart illustrating a method for controlling an electronic device according to an embodiment of the present disclosure. The embodiment shown in FIG. 10 is described in greater detail with reference to FIG. 11.

Figure 11:
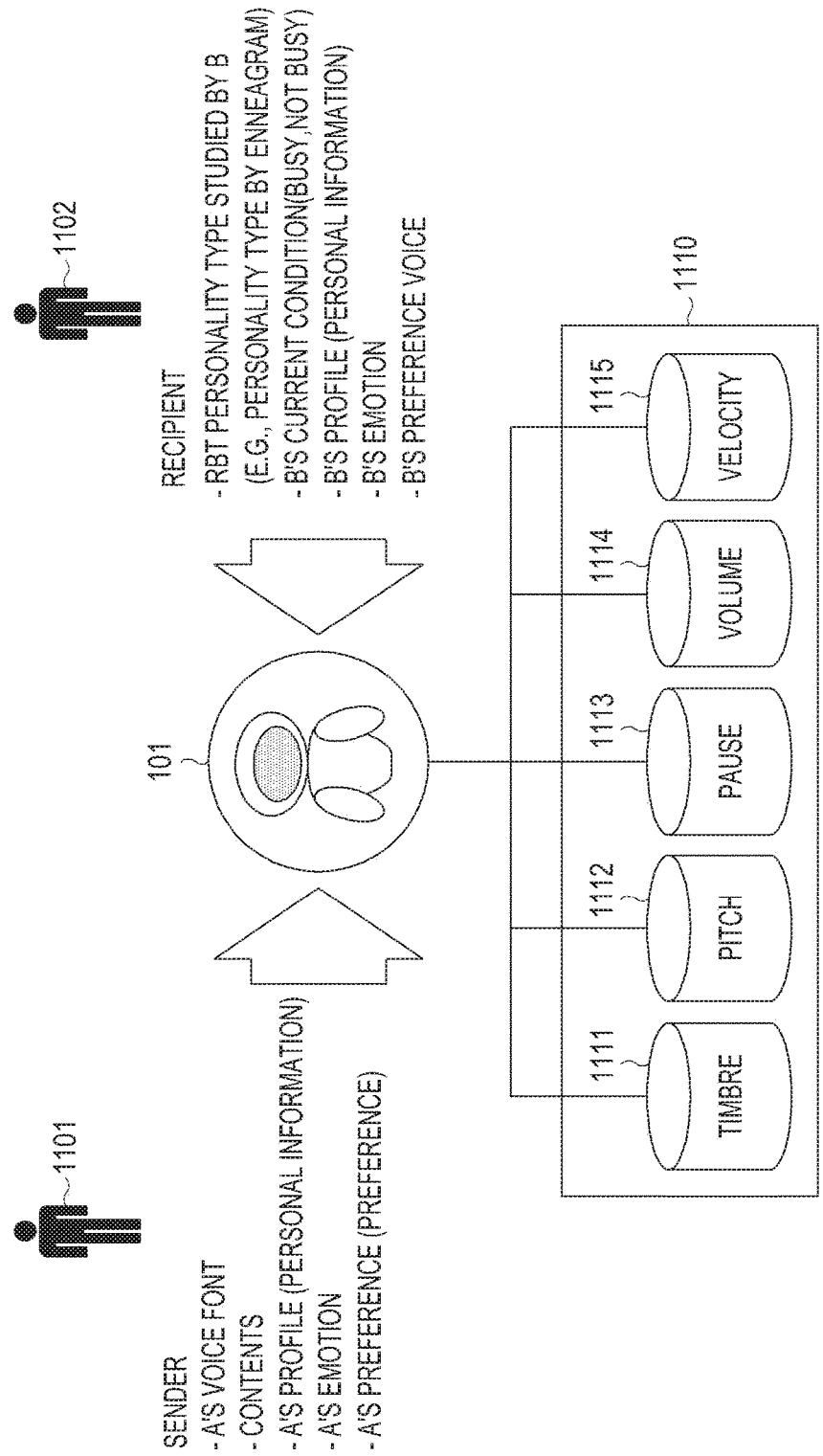
FIG. 11 is a concept view illustrating an operation of an electronic device according to an embodiment of the present disclosure.

FIG. 11 is a concept view illustrating an operation of an electronic device according to an embodiment of the present disclosure.

Referring to FIG. 10, in operation 1011, the electronic device 101 may obtain the first message. In operation 1013, the electronic device 101 may determine a recipient of the first message.

In operation 1015, the electronic device 101 may determine at least one voice determination variable according to the first relationship information between the sender and the recipient and the second relationship information between the recipient information and the electronic device.

In an embodiment, referring to FIG. 11, the electronic device 101 may store, as the voice determination variable, at least one database 1110 including at least one of a timbre database 1111, a pitch database 1112, a pause database 1113, a volume database 1114, and a velocity database 1115. The electronic device 101 may include at least one timbre model in the timbre database 1111. The electronic device 101 may include at least one pitch model in the pitch database 1112. The electronic device 101 may include at least one pause model in the pause database 1113. The electronic device 101 may include at least one volume model in the volume database 1114. The electronic device 101 may include at least one velocity model in the velocity database 1115. The electronic device 101 may determine at least one of the timbre, pitch, pause, volume, and velocity from the respective databases based on the first relationship information and the second relationship information. The electronic device 101 may store association information between at least one of the timbre, pitch, pause, volume, and velocity corresponding to the first relationship and the second relationship and may determine at least one of the timbre, pitch, pause, volume, and velocity based on the association information.

Further, the electronic device 101 may determine the voice determination variable based on at least one of the information on the sender 1101 and the information on the recipient 1102. For example, the electronic device 101 may determine the voice determination variable using at least one of the voice font of the sender 1101, the content of the message, the profile information on the sender 1101, emotional information on the sender 1101, and preference information on the sender 1101. Further, the electronic device 101 may determine the voice determination variable using at least one of the current condition of the recipient 1102, the personal information on the recipient 1102, the emotional information on the recipient 1102, and the preference information on the recipient 1102. Further, the electronic device 101 may determine the voice determination variable using both the information on the sender 1101 and the information on the recipient 1102. The electronic device 101 may determine the type of personality of the recipient 1102 by study and may determine the voice determination variable using the type of personality determined by the result of study.

In operation 1017, the electronic device 101 may output the first message according to the determined voice determination variable.

Figure 12:
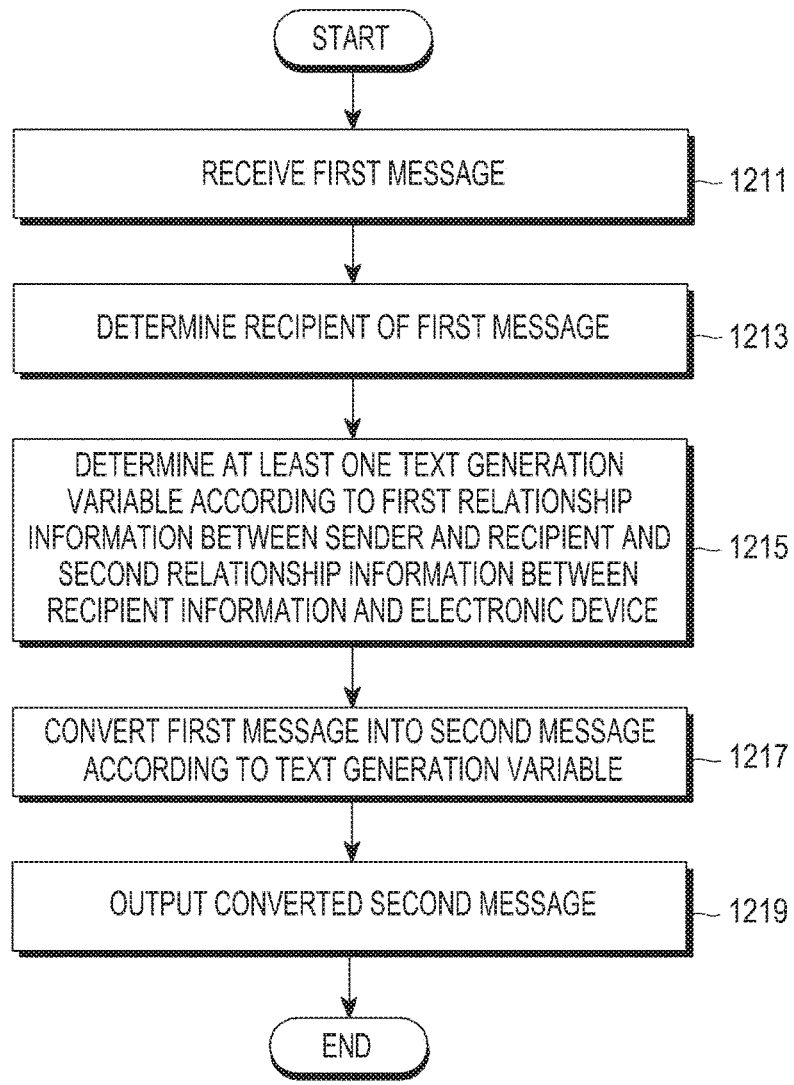
FIG. 12 is a flowchart illustrating a method for controlling an electronic device according to an embodiment of the present disclosure.

FIG. 12 is a flowchart illustrating a method for controlling an electronic device according to an embodiment of the present disclosure. The embodiment shown in FIG. 12 is described in greater detail with reference to FIG. 13.

Figure 13:
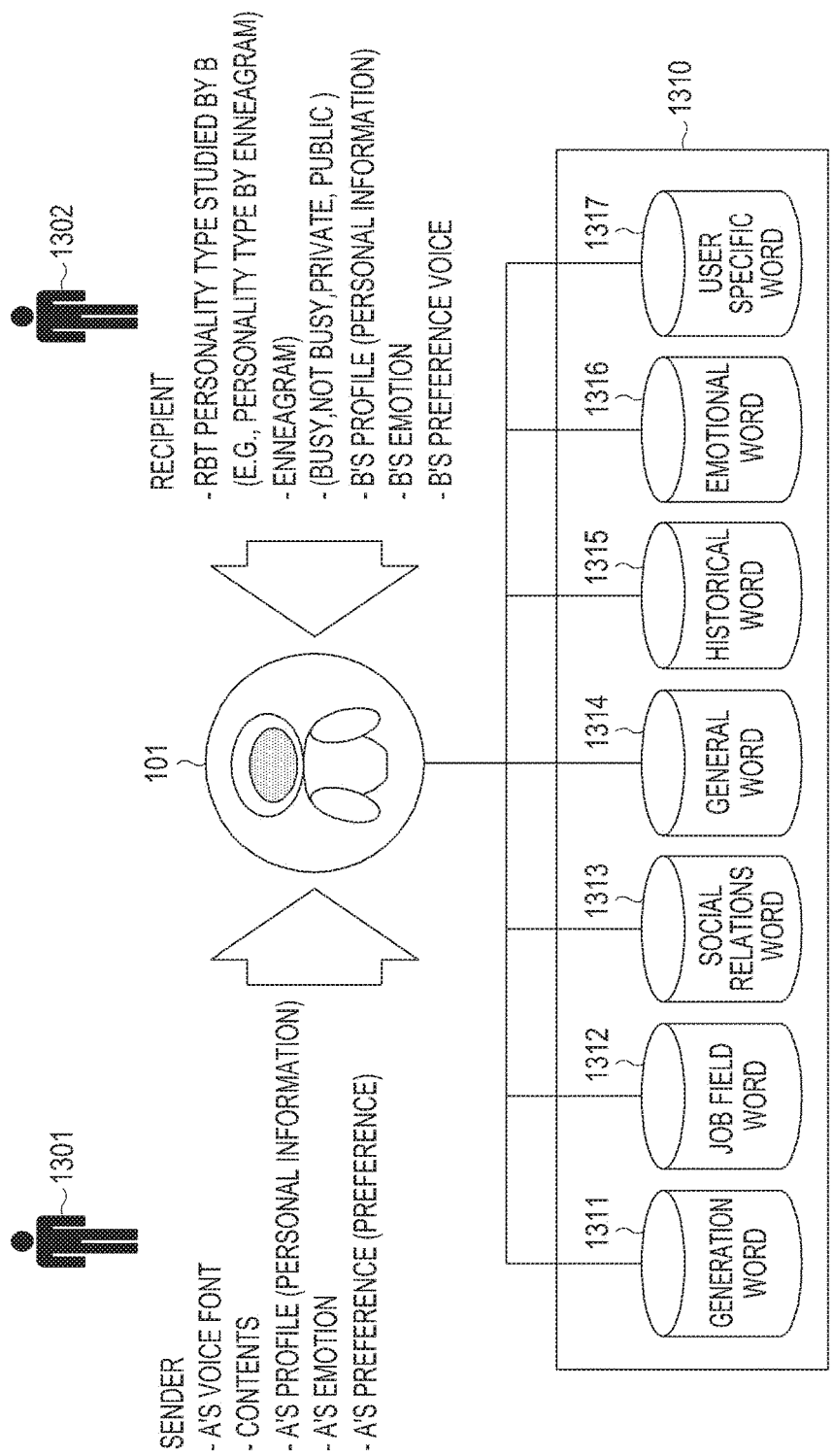
FIG. 13 is a concept view illustrating an operation of an electronic device according to an embodiment of the present disclosure.

FIG. 13 is a concept view illustrating an operation of an electronic device according to an embodiment of the present disclosure.

Referring to FIG. 12, in operation 1211, the electronic device 101 may receive the first message. In operation 1213, the electronic device 101 may determine a recipient of the first message.

In operation 1215, the electronic device 101 may determine at least a text generation variable according to the first relationship information between the sender and the recipient and the second relationship information between the recipient information and the electronic device.

In an embodiment, referring to FIG. 13, the electronic device 101 may store, as the text generation variable, at least one database 1310 including database of a generation word database 1311, a job field word database 1312, a social relations word database 1313, a general word database 1314, a historical word database 1315, an emotional word database 1316, and a user specific word database 1317.

In an embodiment, as described in detail with reference to FIG. 7, the electronic device 101 may add the appellation "Ma'am" corresponding to the attribute, secretary 712, corresponding to the recipient of the mother 702. The electronic device 101 stores the additional appellation "Ma'am" in the generation word database 1311. The electronic device 101 may add the text stored in the generation word database 1311 corresponding to the relationship information.

In an embodiment, the electronic device 101 may store a job field word in the job field word database 1312. For example, when the attribute of the electronic device 101 is a particular job, words frequently used per job may be stored in the job field word database 1312. When a particular job is determined to be the attribute, the electronic device 101 may add its corresponding word from the job field word database 1312. For example, when outputting a sports-related content or the electronic device is configured to have sports-related job worker settings and outputs the text content "relief pitcher blanked the opponent for the bottom of the ninth inning," the electronic device 101 may reprocess the same to say, e.g., "relief pitcher put out the fire for the bottom of the ninth inning" using the words or phrases in the job field word database 1312. In other words, the electronic device 101 may store the words or phrases "put out the fire" that may replace "blanked the opponent" in the job field word database 1312 and use the same.

In an embodiment, the electronic device 101 may store social relations words, e.g., the word "please" used to politely asking for something, in the social relations word database 1313. When determined for a polite favor to be required according to the relationship information between the electronic device 101 and the relationship information or the relationship information between the sender and the recipient, the electronic device 101 may add a social relations word from the social relations word database 1313. In other words, the electronic device 101 may store words to add or exchange depending on the linguistic custom by the cultural area when transferring the message. Further, the electronic device 101 may store words related to the job duty or position in the social relations word database 1313. For example, when a recipient with a job position, such as the President or CEO, is determined, the electronic device 101 may determine an appellation, such as "Yes, President."

In an embodiment, the electronic device 101 may store general words, e.g., a word for the purpose of delivery, such as "to," in the general word database 1314. For example, the electronic device 101 may store basic words and idioms for configuring phrases. The electronic device 101 may reconfigure the phrase by adding the general words required during the course of message conversion for output to the recipient from the general word database 1314.

In an embodiment, the electronic device 101 may store historical words in the historical word database 1315. For example, the electronic device 101 may identify the words extracted from the history of messages transmitted from the sender and store the same in the historical word database 1315. In this case, the electronic device 101 may, upon output, add a corresponding word based on the attribute of the sender. The electronic device 101 may study and store the historical words from the message transferred from the sender. Or, the electronic device 101 may study and store historical words in the routine online or offline conversation between the sender and the recipient.

In an embodiment, the electronic device 101 may store emotional words, e.g., a word expressing a surprise, such as "Oh," in the emotional word database 1316. The electronic device 101 may add an emotional word from the emotional word database 1316, corresponding to the emotion required in the message conversion process for output to the recipient.

In an embodiment, the electronic device 101 may store user specific words in the user specific database 1317. For example, the electronic device 101 may store words corresponding to teenagers. Upon determining that the recipient is a teenager, the electronic device 101 may extract a word from the user specific database 1317 and add the same upon output.

In an embodiment, when the message received from the sender contains a word stored in a teenager specific database, the electronic device 101 may exchange with the recipient use word or add the description of the specific word by referring to the user specific word database 1317 and may output the same to the recipient.

The electronic device 101 may include at least one additional word in the generation word database 1311. The electronic device 101 may reprocess the message by adding or exchanging words using the generation word database 1311. The generation word database 1311 may include at least one of the job field word database 1312, the social relations word database 1313, the general word database 1314, the historical word database 1315, the emotional word database 1316, and the user specific word database 1317. The electronic device 101 may include at least one job field words in the job field word database 1312. The electronic device 101 may include at least one social relations word in the social relations word database 1313. The electronic device 101 may include at least one timbre model in the general word database 1314. The electronic device 101 may include at least one historical word in the historical word database 1315. The electronic device 101 may include at least one emotional word in the emotional word database 1316. The electronic device 101 may include at least one user specific word in the user specific word database 1317. The electronic device 101 may store association information between at least one of the additional word, the job field word, the social relations word, the general word, the historical word, the emotional word, and the user specific word and the first relationship and the second relationship, and the electronic device 101 may determine at least one of the additional word, the job field word, the social relations word, the general word, the historical word, the emotional word, and the user specific word based on the association information.

Further, as described above, the electronic device 101 may determine the text generation variable based on at least one of the information on the sender 1301 and the information on the recipient 1302. For example, the electronic device 101 may determine the text generation variable using at least one of the voice font of the sender 1301, the content of the message, the profile information on the sender 1301, emotional information on the sender 1101, and preference information on the sender 1101. Further, the electronic device 101 may determine the text generation variable using at least one of the current condition of the recipient 1302, the personal information on the recipient 1302, the emotional information on the recipient 1302, and the preference information on the recipient 1302. Further, the electronic device 101 may determine the text generation variable using both the information on the sender 1301 and the information on the recipient 1302. The electronic device 101 may determine the type of personality of the recipient 1302 by study and may determine the text generation variable using the type of personality determined by the result of study.

In operation 1217, the electronic device 101 may convert the first message into the second message according to the determined text generation variable. In operation 1219, the electronic device 101 may output the second message.

Figure 14A:
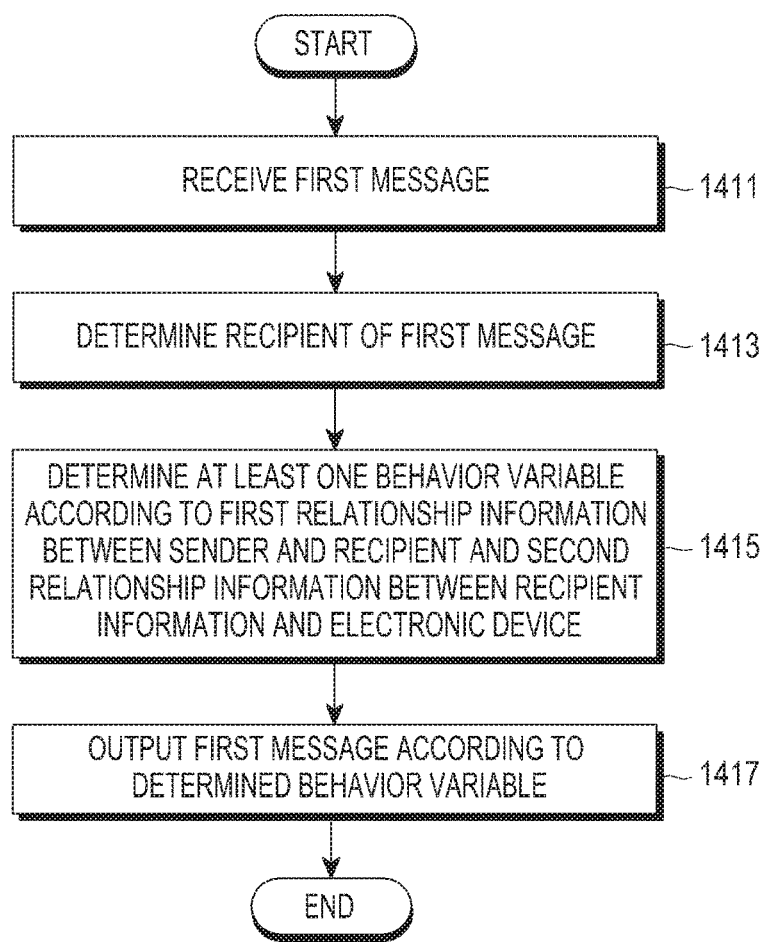
FIG. 14A is a flowchart illustrating a method for controlling an electronic device according to an embodiment of the present disclosure.

FIG. 14A is a flowchart illustrating a method for controlling an electronic device according to an embodiment of the present disclosure. The embodiment shown in FIG. 14A is described in greater detail with reference to FIG. 14B.

Figure 14B:
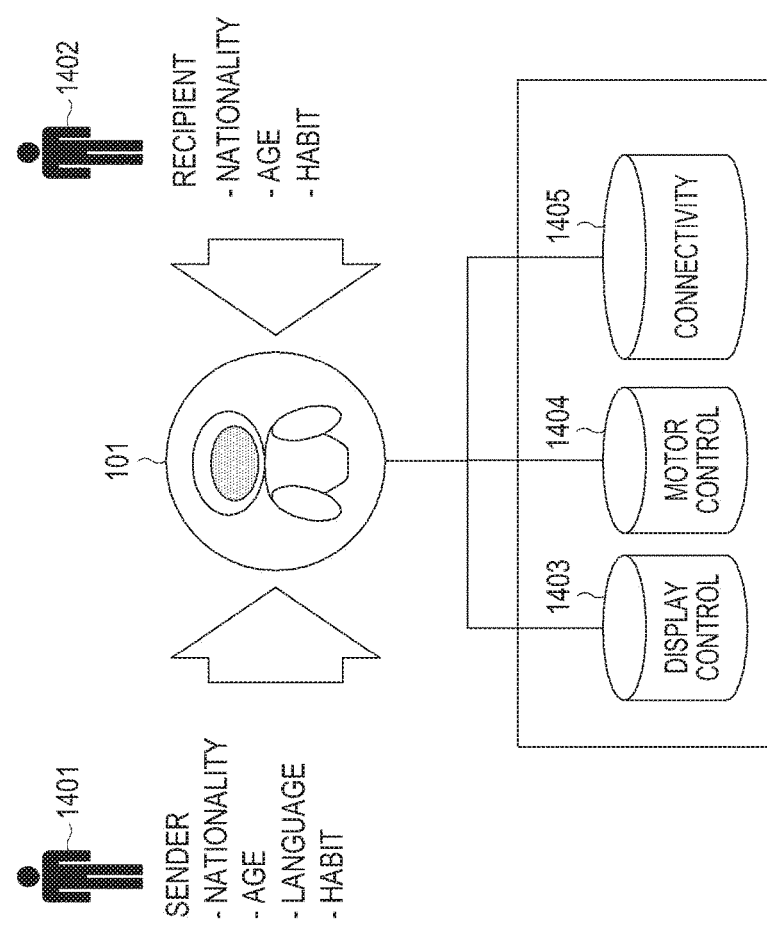
FIG. 14B is a concept view illustrating an operation of an electronic device according to an embodiment of the present disclosure.

FIG. 14B is a concept view illustrating an operation of an electronic device according to an embodiment of the present disclosure.

Referring to 14A, in operation 1411, the electronic device 101 may receive the first message. In operation 1413, the electronic device 101 may determine a recipient of the first message.

In operation 1415, the electronic device 101 may determine at least a behavior variable according to the first relationship information between the sender and the recipient and the second relationship information between the recipient information and the electronic device.

In an embodiment, referring to FIG. 14B, the electronic device 101 may store, as the behavior variable, at least one of a display control database 1403, a motor control database 1404, and a connectivity database 1405.

In an embodiment, the electronic device 101 may store in the display control database 1403 information such as the screen showing a facial expression, or the color or font type of the display, corresponding to the first relationship information and the second relationship information. The electronic device 101 may perform display control by determining the behavior variable from the display control database 1403 based on the first relationship information and the second relationship information.

In an embodiment, the electronic device 101 may store information such as the operation of the robot in the motor control database 1404 corresponding to the first relationship information and the second relationship information. The electronic device 101 may perform motor control by determining the behavior variable from the motor control database 1404 based on the first relationship information and the second relationship information.

In an embodiment, the electronic device 101 may store information such as communication connection with other electronic device in the connectivity database 1405, corresponding to the first relationship information and the second relationship information. The electronic device 101 may perform communication connection by determining the behavior variable from the connectivity database 1405 based on the first relationship information and the second relationship information.

The electronic device 101 may include at least one display control command in the display control database 1403. The electronic device 101 may include at least one motor control command in the motor control database 1404. The electronic device 101 may include at least one connection command in the connectivity database 1405. The electronic device 101 may store association information between at least one of the display control command, the motor control command, and the connection command and the first relationship and the second relationship and may determine at least one of the display control command, the motor control command, and the connection command based on the association information.

Further, as described above, the electronic device 101 may determine the behavior variable based on at least one of the information on the sender 1401 and the information on the recipient 1402. For example, the electronic device 101 may determine the behavior variable using at least one of the information on the nationality, age, language, and custom of the sender 1401. Further, the electronic device 101 may determine the behavior variable using at least one of the information on the nationality, age, language, and custom of the recipient 1402. Further, the electronic device 101 may determine the text generation variable using both the information on the sender 1401 and the information on the recipient 1402.

In operation 1417, the electronic device 101 may output the first message according to the determined behavior variable.

Figure 15:
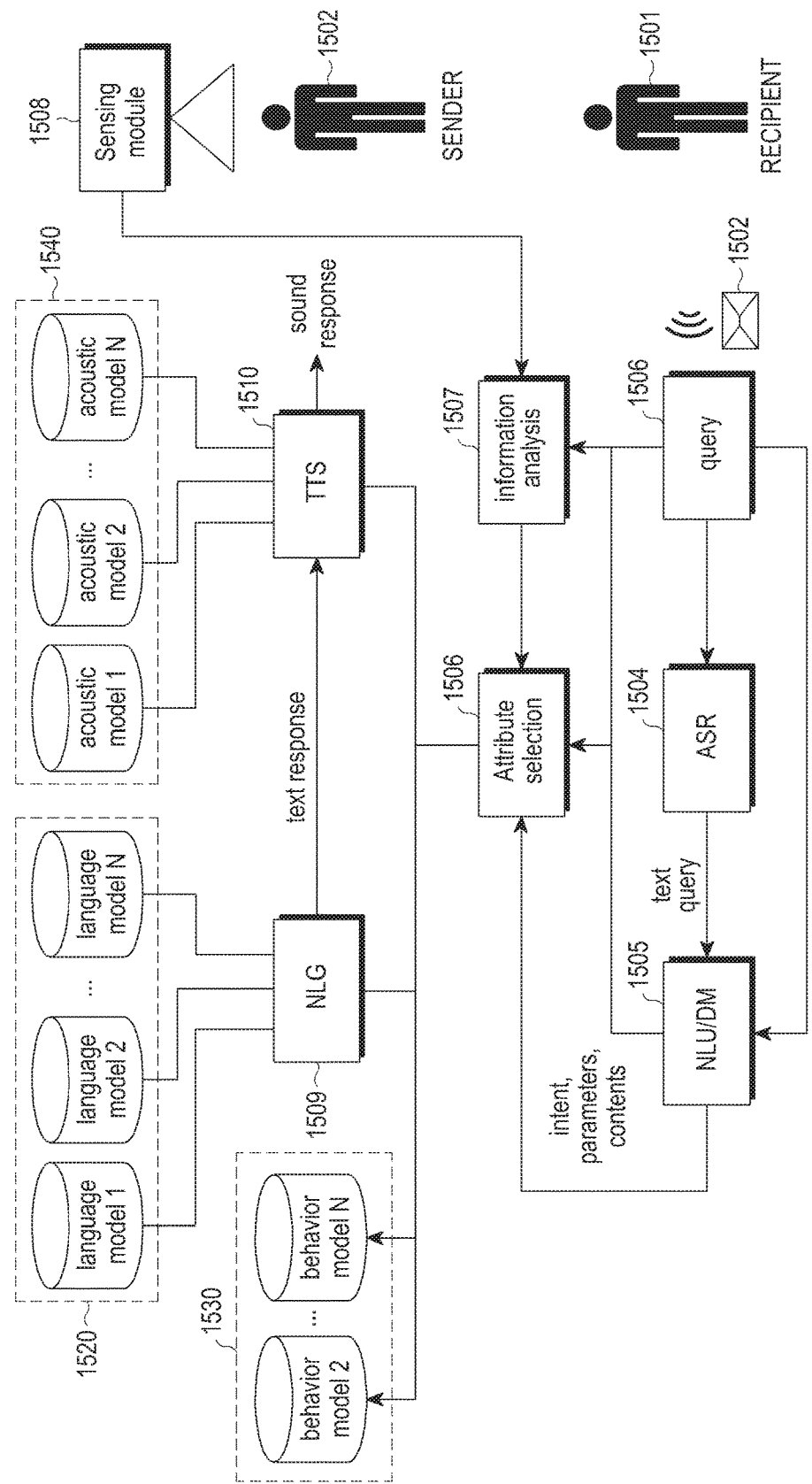
FIG. 15 is a concept view illustrating message conversion by an electronic device according to an embodiment of the present disclosure.

FIG. 15 is a concept view illustrating message conversion by an electronic device according to an embodiment of the present disclosure.

The electronic device 101 may receive a message 1502 from the sender 1502. The electronic device 101 may query (1506) the message 1502 with a voice to perform acoustic speech recognition 1504. Or, the electronic device 101 may query (1506) the metadata of the message 1502 to perform information analysis 1507. In particular, the electronic device 101 may determine the recipient 1501 with the information gathered by performing information analysis 1507 through the sensing module 1508. Further, the electronic device 101 may use the information regarding the recipient 1501 for attribute selection 1506.

The electronic device 101 may obtain text as a result of the acoustic speech recognition 1504 and may query the same to perform natural language understanding (NLU)/dialog management (DM) 1505. Here, the text may be recognized as a phrase through the NLU/DM. The electronic device 101 may use at least one of the intent, parameter, and content obtained through the NLU/DM 1505 for attribute selection 1506. The electronic device 101 may use the query 1506 of the message 1502 itself for the attribute selection 1506.

The electronic device 101 may select one of at least one language model 1520 through a natural language generator (NLG) 1509 based on the determined attribute. For example, the electronic device 101 may determine at least one text generation variable.

The electronic device 101 may select one of at least one behavior model 1530 based on the determined attribute. For example, the electronic device 101 may determine at least one behavior variable.

The electronic device 101 may select of at least one acoustic model 1540 based on the determined attribute. For example, the electronic device 101 may determine at least one voice generation variable to output the message converted into text through the NLG 1509. The electronic device 101 may output a voice response (or sound response) according to the selected acoustic model. The electronic device 101 may perform text-to-speech (TTS) 1510 to output the sound response.

As described above, the electronic device 101 may provide dynamical results to the interacting user by changing the parameters on the NLG or TTS module according to the relationship between at least one or more entities or the content to be transferred.

The electronic device 101 may utilize, e.g., the sensor such as vision or sound for identifying at least one or more users and environment and personal profile data, as well as the content of the message to be transferred in the attribute selection process 1506. For the language model 1520, different language models may be determined depending on the recipient and the electronic device 101. For example, when the relationship between the recipient and the electronic device 101 is set as friends previously or by study, a language model for configuring words or phrases expressing intimacy may be selected, and for an urgent message, an acoustic model with the feature of clear tones may be selected and language-exchanged. According to an embodiment of the present disclosure, the electronic device 101 may modulate the voice with a low-frequency band voice acoustic model and output the same based on the information indicating that the recipient has difficulty hearing high-frequency band voices.

Figure 16:
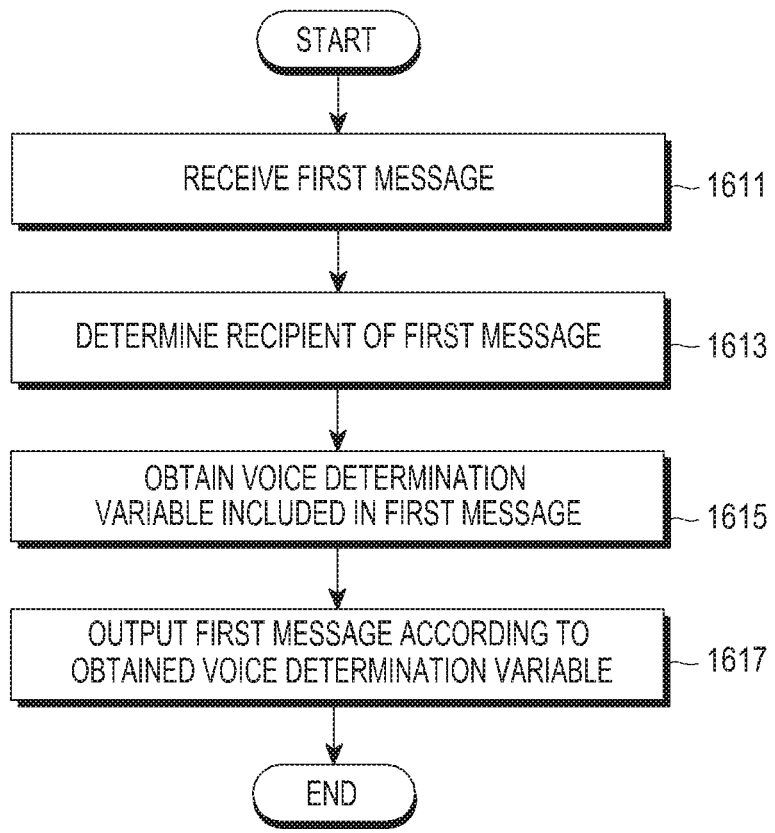
FIG. 16 is a flowchart illustrating a method for controlling an electronic device according to an embodiment of the present disclosure.

FIG. 16 is a flowchart illustrating a method for controlling an electronic device according to an embodiment of the present disclosure. The embodiment shown in FIG. 16 is described in greater detail with reference to FIG. 17.

Figure 17:
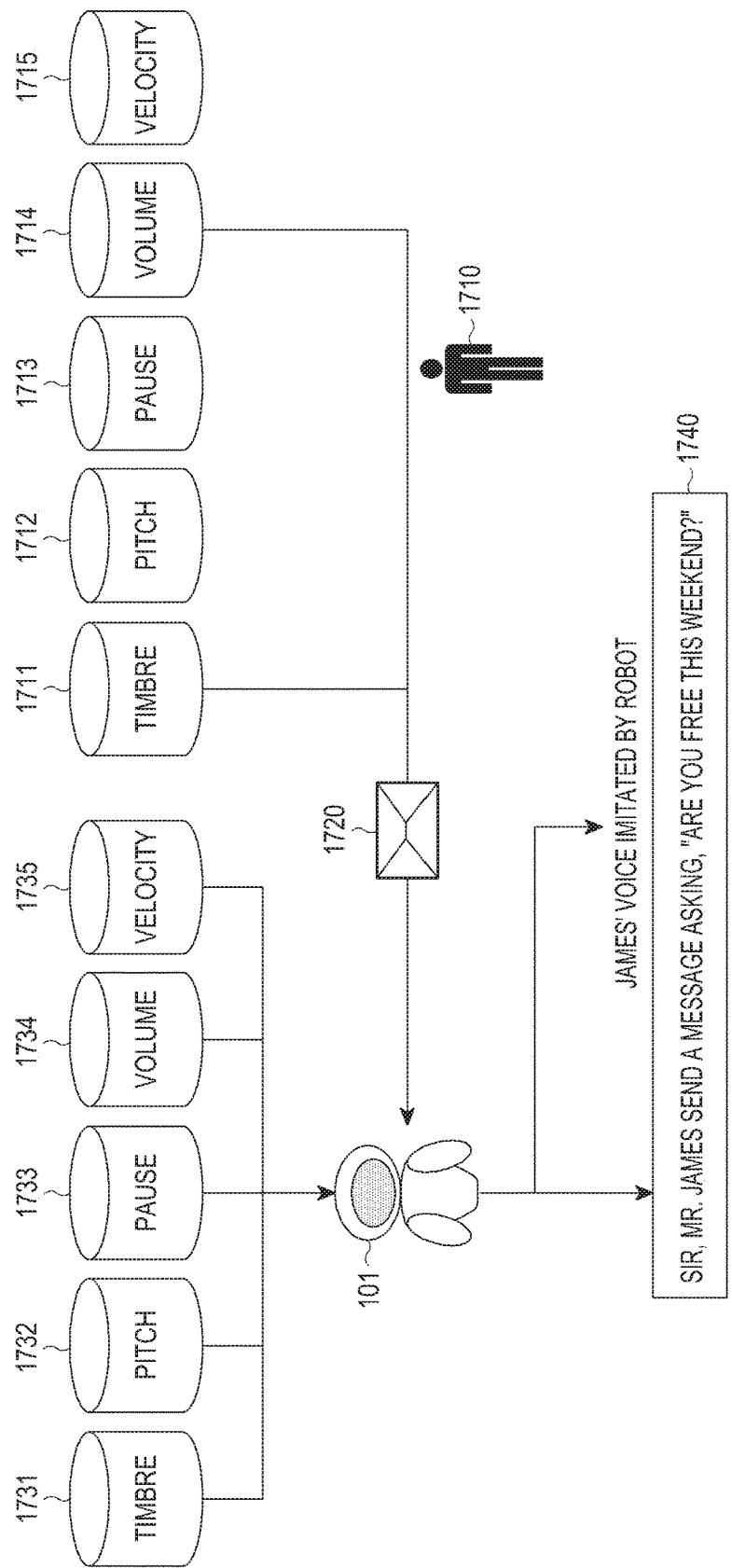
FIG. 17 is a concept view illustrating an operation of an electronic device according to an embodiment of the present disclosure.

FIG. 17 is a concept view illustrating an operation of an electronic device according to an embodiment of the present disclosure.

Referring to FIG. 16, in operation 1611, the electronic device 101 may receive the first message. In operation 1613, the electronic device 101 may determine a recipient of the first message.

In operation 1615, the electronic device 101 may obtain the voice determination variable included in the first message. For example, referring to FIG. 17, the electronic device 101 may obtain at least one voice determination variable 1711 to 1715 included in the message 1720 from the sender 1710. In an embodiment, the sender 1710 may directly input the message 1720 to the electronic device 101 by voice. The electronic device 101 may obtain at least one voice determination variable 1711 to 1715 by analyzing the obtained voice. Or, the electronic device of the sender 1710 may transmit the message 1720 including the voice to the electronic device 101. The 101 may obtain at least one voice determination variable 1711 to 1715 by analyzing the voice in the received message 1720. Or, the electronic device 101 may previously store at least one voice determination variable 1711 to 1715 corresponding to the sender and may obtain the at least one voice determination variable 1711 to 1715 by identifying the sender 1710 when receiving the message 1720.

In operation 1617, the electronic device 101 may output the first message according to the obtained voice determination variable. For example, the electronic device 101 may output a voice 1740 as the at least one voice determination variable 1711 to 1715, so that the voice 1740 may be output in a similar voice to that of the sender 1710. Or, the electronic device 101 may output the content of the message 1720, "Do you have time this weekend?" through the at least one voice determination variable 1711 to 1715 and may output the remaining message, "Sir, you have a message saying" and "from Mr. James," through the at least one voice determination variable 1731 to 1735 determined by the electronic device 101.

Figure 18:
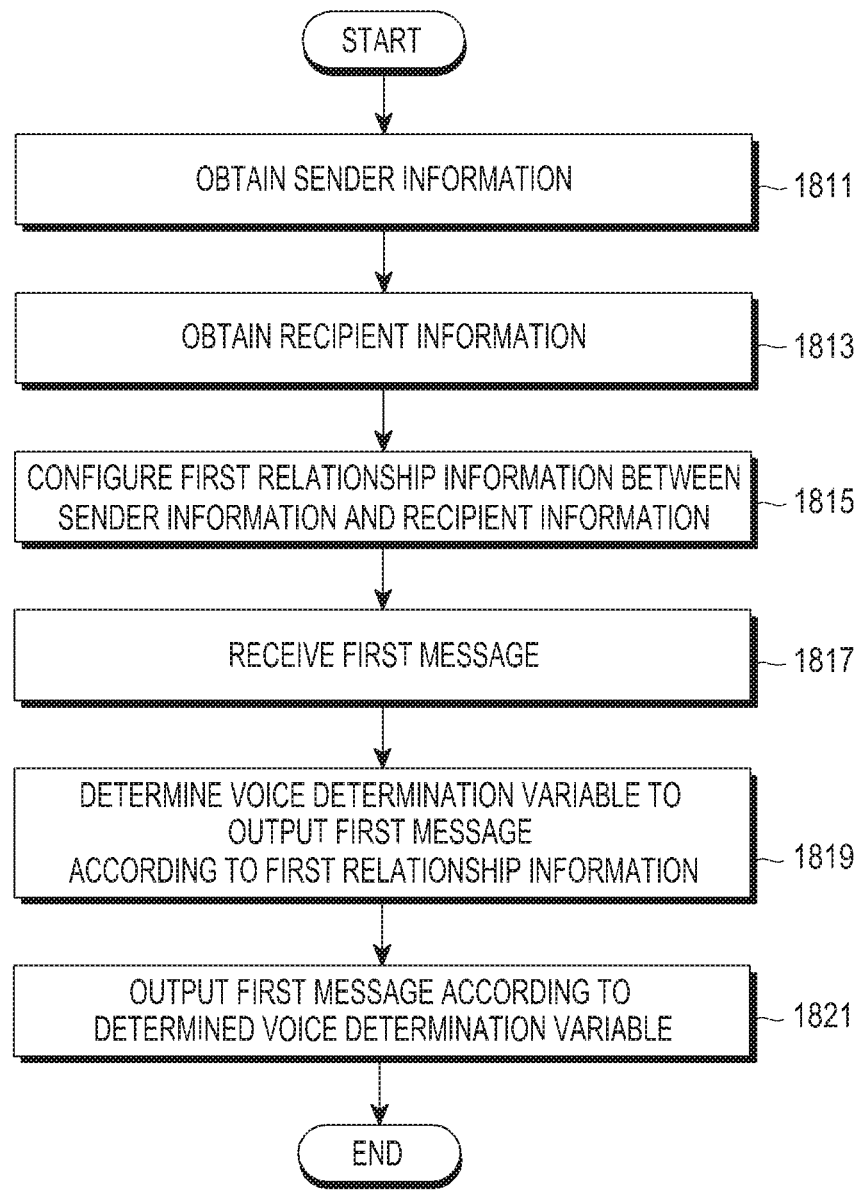
FIG. 18 is a flowchart illustrating a method for controlling an electronic device according to an embodiment of the present disclosure.

FIG. 18 is a flowchart illustrating a method for controlling an electronic device according to an embodiment of the present disclosure. The embodiment shown in FIG. 18 is described in greater detail with reference to FIG. 19.

Figure 19:
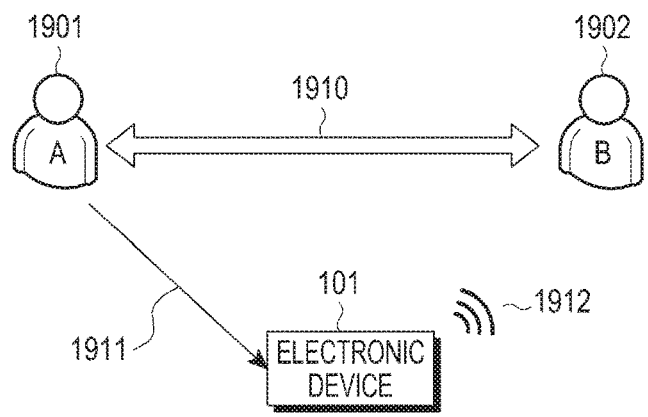
FIG. 19 is a concept view illustrating an operation of an electronic device according to an embodiment of the present disclosure.

FIG. 19 is a concept view illustrating an operation of an electronic device according to an embodiment of the present disclosure.

Referring to FIG. 18, in operation 1811, the electronic device 101 may obtain the sender information. In operation 1813, the electronic device 101 may obtain the recipient information. In operation 1815, the electronic device 101 may configure the first relationship information between the sender information and the recipient information. For example, referring to FIG. 19, the electronic device 101 may configure the first relationship information 1910 between the sender 1901 and the recipient 1902.

In operation 1817, the electronic device 101 may receive a first message 1911 as shown in FIG. 19. In operation 1819, the electronic device 101 may determine the voice determination variable to output the first message 1911 according to the first relationship information 1910. In operation 1821, the electronic device 101 may output the first message as a voice 1912 according to the determined voice determination variable. For example, when the first relationship information 1910 is about friendship, the electronic device 101 may determine the voice determination variable to reflect an informal characteristic. Or, when the first relationship information 1910 is about superior-inferior relationship, the electronic device 101 may determine the voice determination variable to reflect a formal characteristic.

Figure 20:
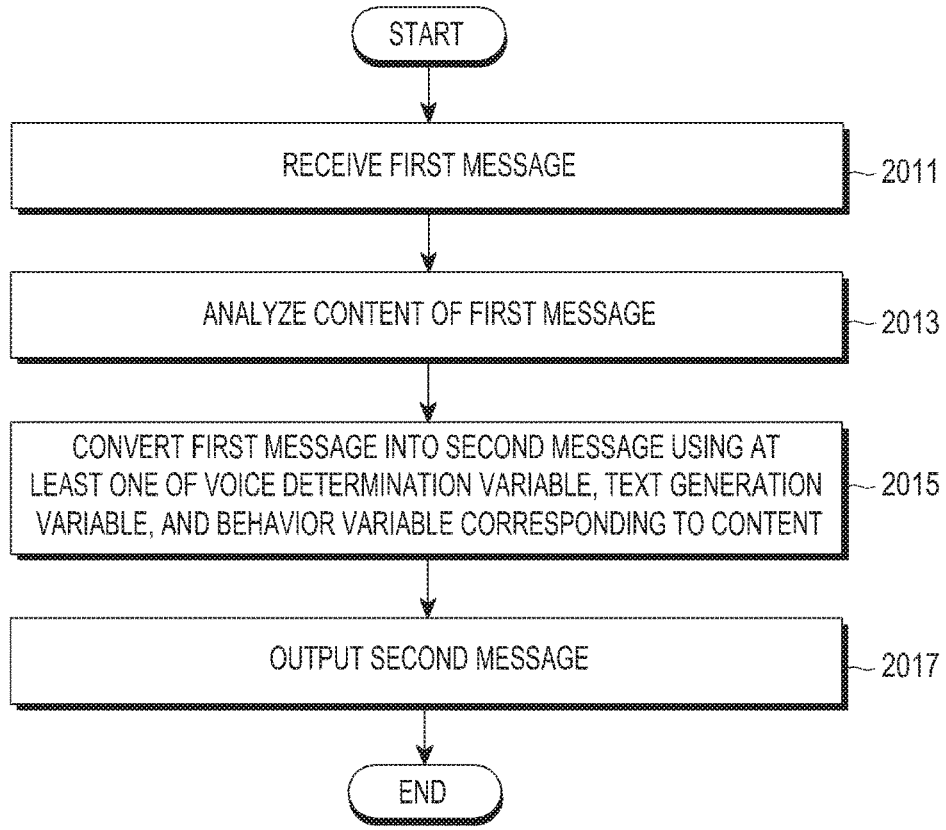
FIG. 20 is a flowchart illustrating a method for controlling an electronic device according to an embodiment of the present disclosure.

FIG. 20 is a flowchart illustrating a method for controlling an electronic device according to an embodiment of the present disclosure.

Referring to FIG. 20, in operation 2011, the electronic device 101 may receive the first message. In operation 2013, the electronic device 101 may analyze the content of the first message. The electronic device 101 may parse the content of the first message, except, e.g., verbs for requesting transfer or the recipient. The electronic device 101 may determine the type by analyzing the parsed content. In operation 2015, the electronic device 101 may convert the first message into a second message using at least one of a voice determination variable, a text generation variable, and a behavior variable corresponding to the content. In operation 2017, the electronic device 101 may output the second message.

For example, when inquired about the weather by the user, the electronic device 101 may determine that the received message is related to weather, and the content to be transferred to the recipient is also a weather-related response. Accordingly, the electronic device 101 may transfer the information to the recipient using the way a particular weather caster talks when providing the result of the weather, and when the message to be transferred by the sender to the recipient is "Please let James know tomorrow's weather," the electronic device 101 may transfer the information on the tomorrow's weather to the recipient, James, as if the weather caster does. Besides, the electronic device 101 may make a speech for the message differentiated as the content providable by a speaker belonging to a particular job field, e.g., news or sports information, adding the features of the providing method. Here, the electronic device 101 may generate a natural language and voice generation variable and then make a speech, while comprehensively reflecting the relationship between the recipient and the electronic device 101 and the content including the relationship between the recipient and the electronic device 101.

Figure 21:
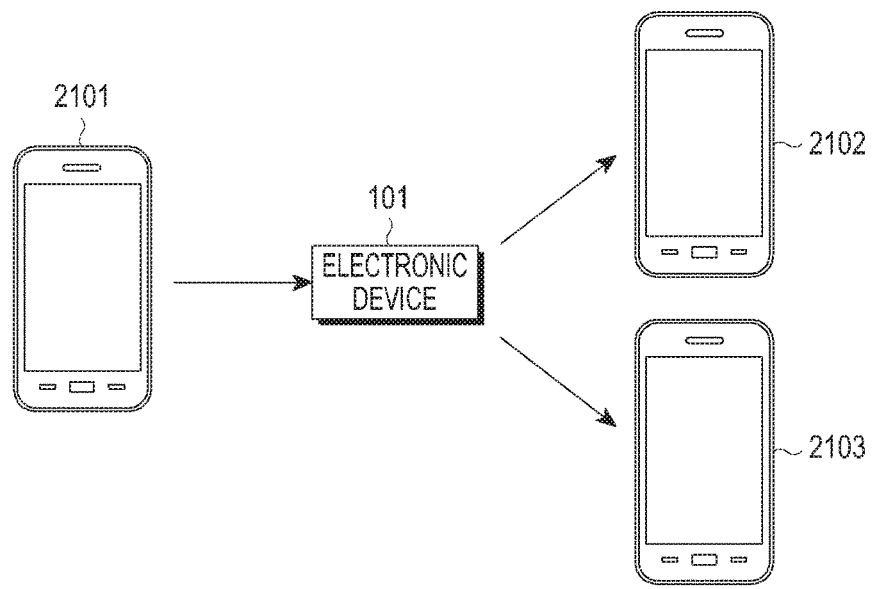
FIGS. 21, 22A, and 22B are concept views illustrating operations of an electronic device according to various embodiments of the present disclosure.
Figures 22A, 22B:
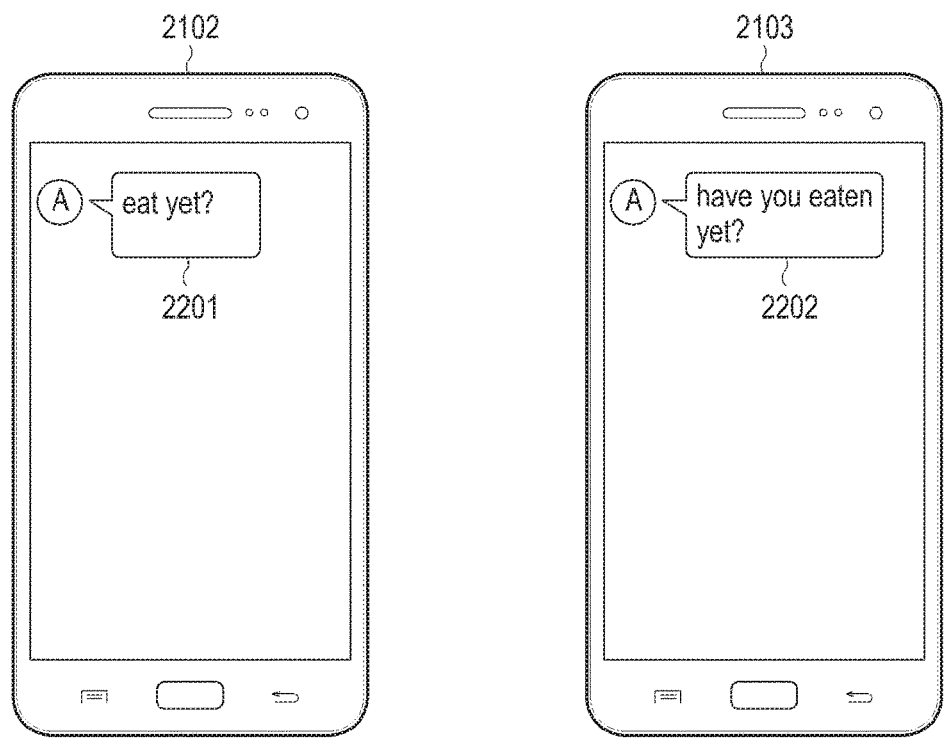

FIGS. 21, 22A, and 22B are concept views illustrating operations of an electronic device according to various embodiments of the present disclosure.

Referring to FIG. 21, the electronic device 101 may communicate with the transmitter 2101 to the second receiver 2103. The electronic device 101 may form a group chatting session with the transmitter 2101 to the second receiver 2103 and may communicate messages with the transmitter 2101 to the second receiver 2103. For example, as shown in FIG. 21, the transmitter 2101 may transmit a message to the electronic device 101, and the electronic device 101 may transmit the message from the transmitter 2101 to the first receiver 2102 and the second receiver 2103 included in the group chatting session.

The first receiver 2102 and the second receiver 2103 may display the received message as shown in FIGS. 22A and 22B. Meanwhile, the electronic device 101 may convert the message from the transmitter 2101 and transmit the converted message to the first receiver 2102 and the second receiver 2103. The electronic device 101 may convert the message from the transmitter 2101 based on the relationship information between the first user corresponding to the transmitter 2101 and the second user corresponding to the first receiver 2102. For example, the electronic device 101 may receive the message saying "Have you eaten yet?" from the transmitter 2101. The electronic device 101 may determine that the first user of the transmitter 2101 and the second user of the first receiver 2102 are friends and may convert the message "Have you eaten yet?" into "Eat yet?" corresponding to the friendship. Or, the electronic device 101 may determine that the first user of the electronic device 101 and the third user of the second receiver 2103 are in a superior-inferior relationship, and the electronic device 101 may convert the message "Have you eaten yet?" into "Sir, did you have supper?" corresponding to the superior-inferior relationship.

The electronic device 101 may transmit the message converted corresponding to each electronic device on the receiving side to the first receiver 2102 and the second receiver 2103. The electronic device 101 may transmit the message "Eat yet?" to the first receiver 2102 and the message "Sir, have you eaten yet?" to the second receiver 2103. The first receiver 2102 may display the received message 2201 "Eat yet?", and the second receiver 2103 may display the received message 2202 "Sir, did you have supper?" Meanwhile, the message conversion may be performed by any one of the transmitter 2101 to the second receiver 2103 as well as the electronic device 101, and in such case, the message may be directly communicated without the electronic device 101 forwarding the message.

Figure 23:
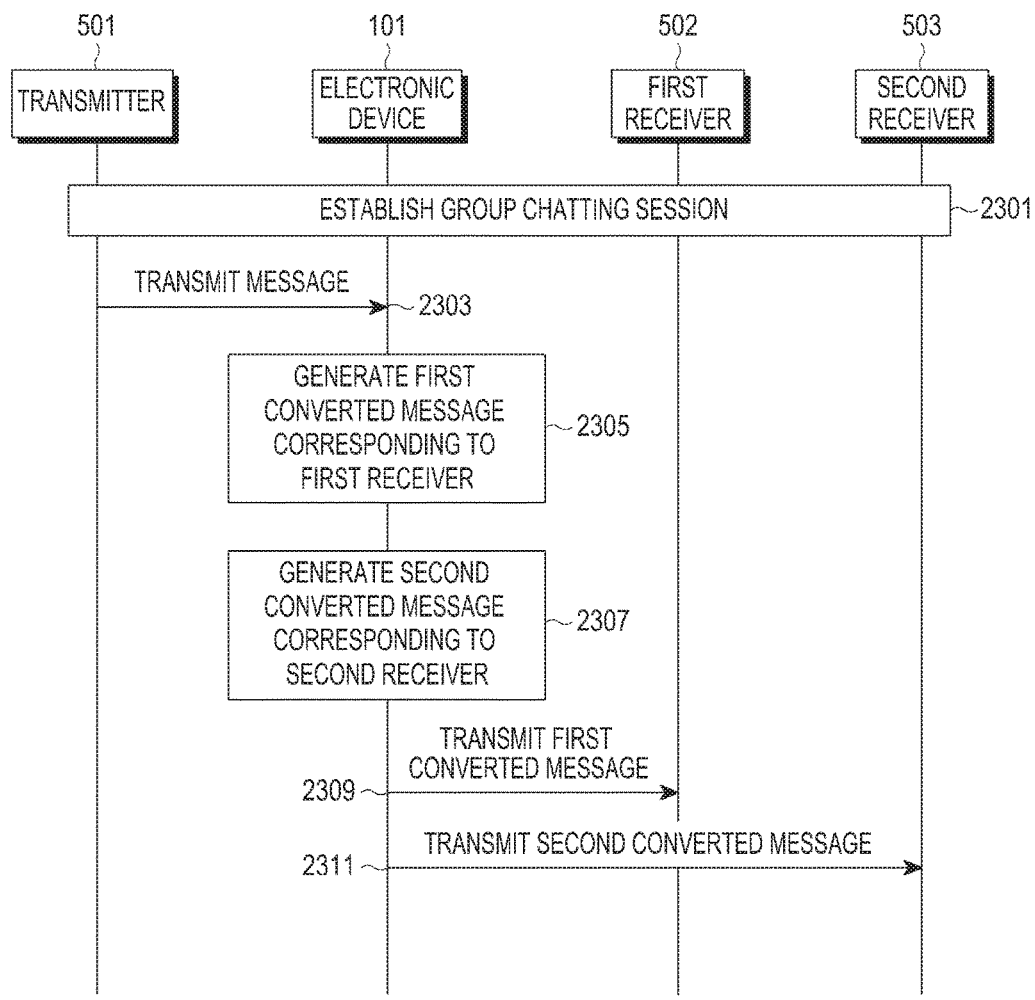
FIG. 23 is a flowchart illustrating an operation of an electronic device according to an embodiment of the present disclosure.

FIG. 23 is a flowchart illustrating an operation of an electronic device according to an embodiment of the present disclosure.

Referring to FIG. 23, in operation 2301, the electronic device 101 may establish a group chatting session with the transmitter 2101, the first receiver 2102, and the second receiver 2103. The electronic device 101 may establish a group chatting session at the request from at least one of the transmitter 2101 to the second receiver 2103.

In operation 2303, the transmitter 2101 may transmit a message in the group chatting session. In operation 2305, the electronic device 101 may generate a first converted message from the received message, corresponding to the first receiver 2102. In operation 2307, the electronic device 101 may generate a second converted message from the received message, corresponding to the second receiver 2103. In operation 2309, the electronic device 101 may transmit the first converted message to the first receiver 2102. In operation 2311, the electronic device 101 may transmit the second converted message to the second receiver 503.

Figure 24:
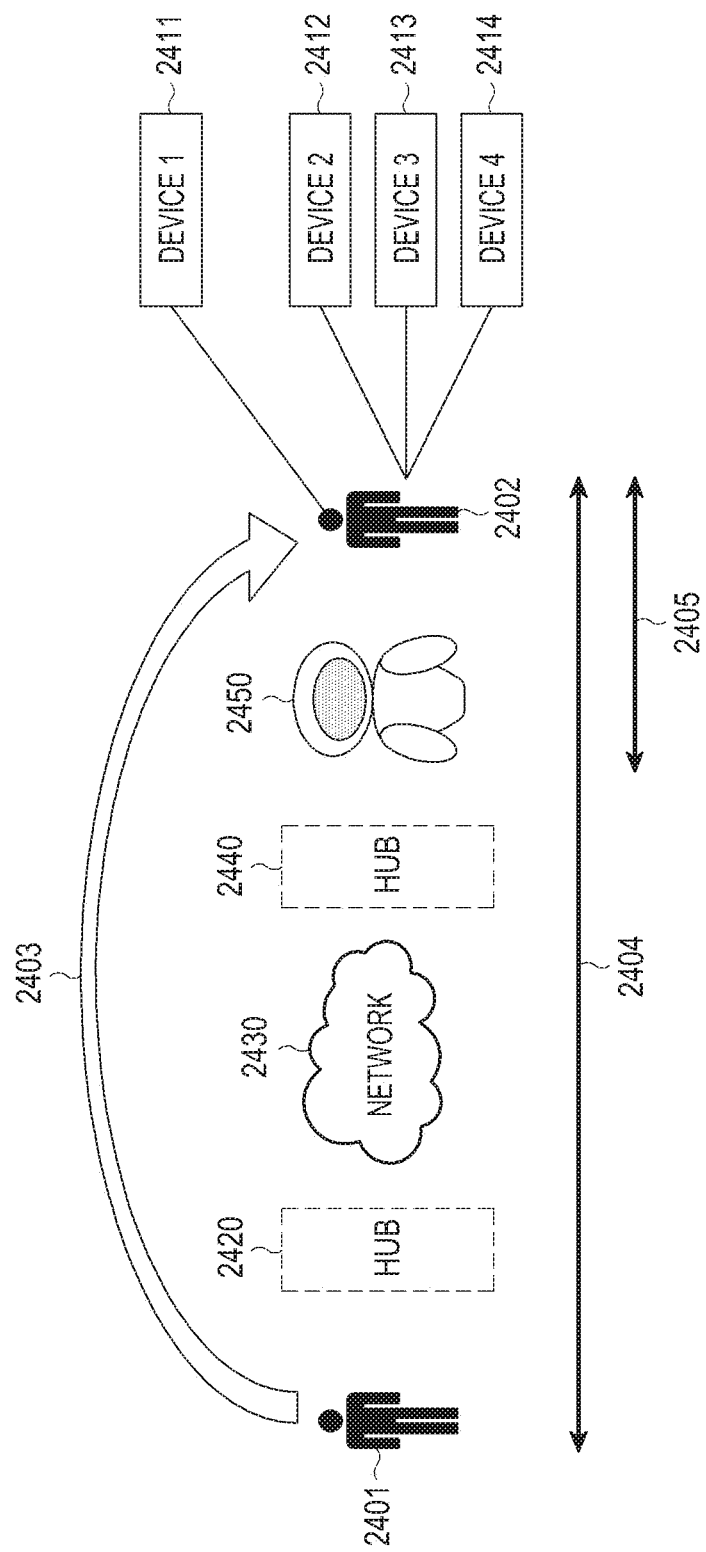
FIG. 24 is a concept view illustrating an operation of an electronic device according to an embodiment of the present disclosure.

FIG. 24 is a concept view illustrating an operation of an electronic device according to an embodiment of the present disclosure.

Referring to FIG. 24, the sender 2401 may transmit a message 2403 to the recipient 2402. According to an embodiment of the present disclosure, the sender 2401 may transfer the message to the recipient 2402 through at least one hub 2420 and 2440 and a network 2430. Further, the electronic device 2402 may receive the message through the at least one hub 2420 and 2440 and the network 2430 and output the same to the recipient 2402. According to an embodiment of the present disclosure, the at least one hub 2420 and 2440 may be implemented in various forms, such as another electronic device, relay, or an input/output device.

According to an embodiment of the present disclosure, the sender 2401 may directly transfer the message to the electronic device 2450 without passing through the network. Further, the recipient 2402 may be connected with one or more various devices 2411, 2412, 2413, and 2414, e.g., a wearable electronic device. In this embodiment, the electronic device 2450 may configure one or more relationship information 2404 and 2405. For example, the electronic device 2450 may configure the relationship information 2404 between the sender 2401 and the recipient 2402 and the relationship information 2405 between the electronic device 2450 and the recipient 2402. The electronic device 2450 may further include a message analyzing module that may analyze the message 2403 received from the sender 2401.

Figure 25:
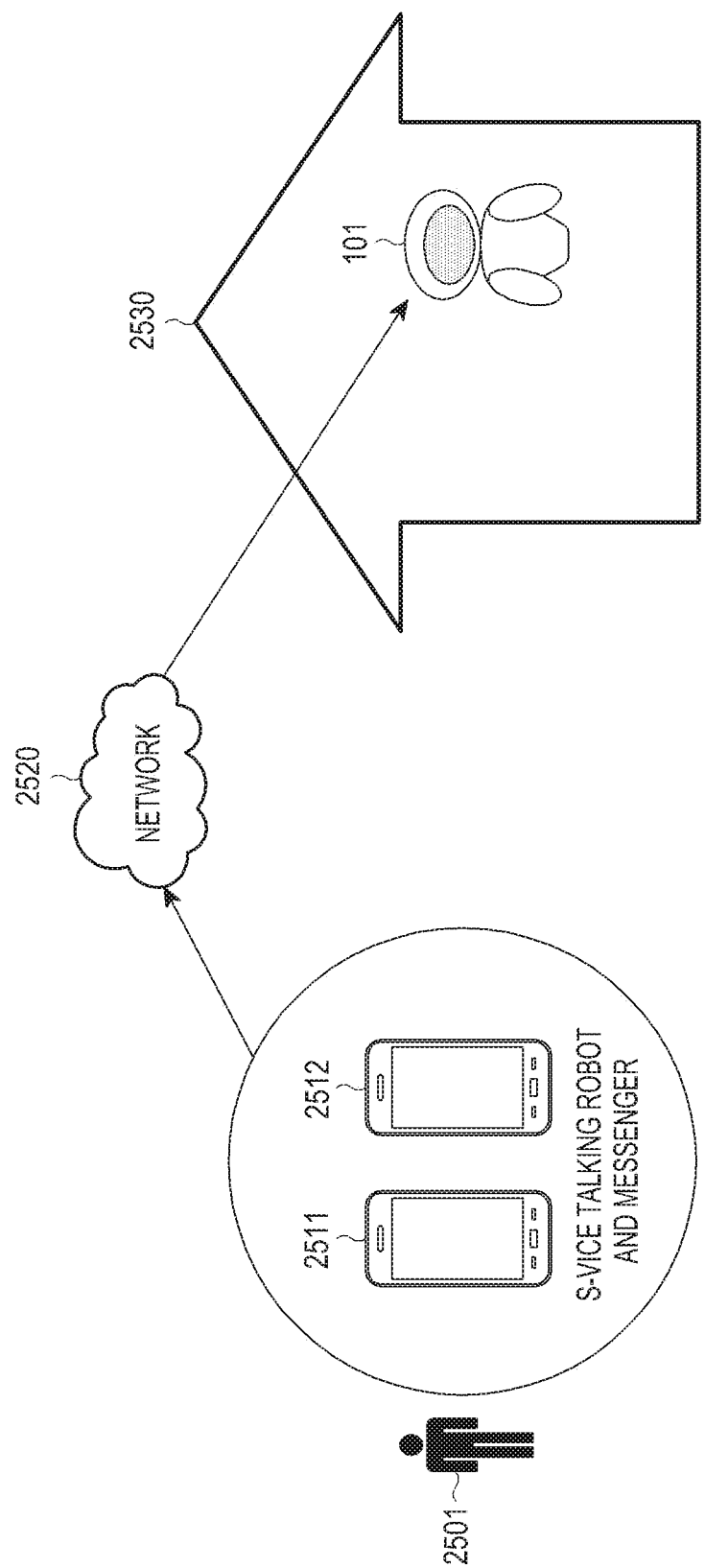
FIG. 25 is a concept view illustrating an operation of an electronic device according to an embodiment of the present disclosure.

FIG. 25 is a concept view illustrating an operation of an electronic device according to an embodiment of the present disclosure.

Referring to FIG. 25, the sender 2501 may transmit a message to the electronic device 101 in a home network 2530 via a network 2520. The sender 2501 may generate a message for at least one or more recipients through his electronic devices 2511 and 2512. Here, the message may include at least one of an SMS message, a push-to-talk message, an SNS message, an image message, and a voice assistant message.

The electronic device 101 may receive the generated message through the communication module and may determine through the sensor whether there are at least one or more users to which to provide a message service. Further, the processor of the electronic device 101 may determine what information the message from the sender 2501 includes. For example, the message generated by the sender 2501 may include personal information on the sender 2501. For example, the personal information may include at least one of the name of the sender 2501, voice information, a relationship with at least one or more persons, a relationship with an access identifier (AID), and the type of the message generating device. The processor may generate at least one or more meaningful information by comparing at least one information with information previously stored in the memory. Further, the electronic device 101 may determine whether there is a recipient that may transfer the message generated by the sender 2501 through the sensor and may grasp the recipient information. The electronic device 101 may generate a message corresponding to the recipient of the message using at least one or more information previously stored in the memory and various information received from the sensor and the communication module and transfer the same to the output unit. Here, the electronic device 101 may output the generated message in various manners depending on the implementation of the output unit.

Figure 26:
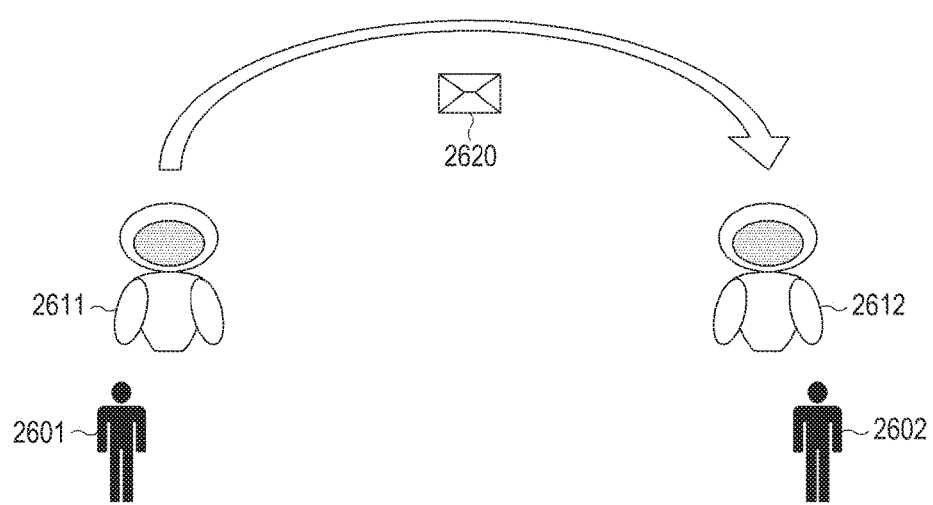
FIG. 26 is a concept view illustrating an operation of an electronic device according to an embodiment of the present disclosure.

FIG. 26 is a concept view illustrating an operation of an electronic device according to an embodiment of the present disclosure.

Referring to FIG. 26, the sender 2601 may input a message using at least one or more means of a voice, a vision, and text through the first electronic device 2611 positioned nearby the sender 2601. Here, the first electronic device 2611 of the sender 2601 may also determine the emotion of the sender 2601 when the sender 2601 inputs the message. For example, the sender 2601 may input the message saying "Tell James I had fun today" to the nearby first electronic device 2611, and here, the first electronic device 2611 may transfer the message 2620 using the recipient 2602, i.e., James, or at least one or more means reachable by the recipient 2602. When the means to receive the message is the second electronic device 2612 of the recipient 2602, the second electronic device 2612 may receive the message and generate a message for the recipient 2602 by referring to the sender information. Upon detection of the recipient 2602, the second electronic device 2612 may reconfigure and output a message saying "Hey James, Jilia said she had fun today." The second electronic device 2612 may reconfigure and transmit the message saying "Hey James! Jilia said she had fun today" with an electronic device available to the recipient 2602. Here, the first electronic device 2611 may obtain the information on the sender 2601 using at least one or more sensors, extract emotional information on the sender 2601, and together with the message, transfer the same to the second electronic device 2612 of the recipient 2602. The second electronic device 2612 may reflect the received emotional information to output the reconfigured message. Additionally, the message received by the second electronic device 2612 may be transferred to the electronic device determined depending on the position of the recipient 2602, various devices connected with the recipient 2602, and the priority of the device.

According to an embodiment of the present disclosure, a method for controlling an electronic device may comprise obtaining a message from a sender, identifying a recipient of the message, converting the message based on first relationship information between the sender and the recipient and second relationship information between the recipient and the electronic device, and outputting the converted message.

According to an embodiment of the present disclosure, converting the message may include determining at least one voice variable for outputting the message based on the first relationship information and the second relationship information and converting the message according to the determined at least one voice variable. The voice variable may include at least one of a timbre, a pitch, a pause, a volume, and a velocity.

According to an embodiment of the present disclosure, converting the message may include determining at least one text generation variable for outputting the message based on the first relationship information and the second relationship information and converting the message according to the determined at least one text generation variable. The text generation variable may include at least one of an additional word, a job field word, a social relations word, a general word, a historical word, an emotional word, and a user specific word.

According to an embodiment of the present disclosure, converting the message may include determining at least one behavior variable for outputting the message based on the first relationship information and the second relationship information and converting the message according to the determined at least one behavior variable. The at least one behavior variable may include at least one of a display control, a driver control, and a connectivity control.

According to an embodiment of the present disclosure, the method may further comprise third relationship information between the sender and the electronic device, wherein converting the message may convert the message based on the first relationship information, the second relationship information, and the third relationship information.

According to an embodiment of the present disclosure, converting the message may perform first conversion on the message to generate first text based on the first relationship information and generate second text based on the second relationship information to generate the converted message including the first text and the second text.

According to an embodiment of the present disclosure, converting the message may include determining a first attribute of an electronic device corresponding to the sender and the recipient and converting the message based on the first relationship information and fourth relationship information between the recipient and the first attribute.

According to an embodiment of the present disclosure, a method for controlling an electronic device may comprise obtaining a message from a sender, identifying a recipient of the message, determining at least one voice variable based on relationship information between the sender and the recipient, and outputting the message according to the determined at least one voice variable.

According to an embodiment of the present disclosure, a method for controlling an electronic device communicating with a plurality of other electronic devices may comprise generating a group chatting session between the plurality of other electronic devices, receiving a message through the group chatting session from a first electronic device of the plurality of other electronic devices, converting the received message according to user information corresponding to each of remaining electronic devices other than the first electronic device among the plurality of other electronic devices to generate a plurality of converted messages, and transmitting each of the plurality of converted messages to each of the remaining electronic devices.

According to an embodiment of the present disclosure, a method for controlling an electronic device may comprise obtaining a message from a sender, analyzing a content of the message, converting the message using at least one of a voice determination variable, a text generation variable, and a behavior variable corresponding to the content, and outputting the converted message.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FP- GAs), or programmable logic arrays (PLAs) that perform some operations, which have already been known or will be developed in the future.

According to an embodiment of the present disclosure, at least a part of the device (e.g., modules or their functions) or method (e.g., operations) may be implemented as instructions stored in a non-transitory computer-readable storage medium e.g., in the form of a program module. The instructions, when executed by a processor (e.g., the processor 120), may enable the processor to carry out a corresponding function. The non-transitory computer-readable storage medium may be e.g., the memory 130.

The non-transitory computer-readable storage medium may include a hardware device, such as hard discs, floppy discs, and magnetic tapes (e.g., a magnetic tape), optical media such as compact disc ROMs (CD-ROMs) and DVDs, magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, there is provided a storage medium storing instructions executed by at least one processor to enable the processor to obtain a message from a sender, identify a recipient of the message, convert the message based on first relationship information between the sender and the recipient and second relationship information between the recipient and the electronic device, and output the converted message.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling an electronic device, the method comprising:
    obtaining, by the electronic device, a message from a sender;
    identifying, by the electronic device, a recipient of the message;
    identifying first relationship information between the sender and the recipient, the identified first relationship information comprising a type of personal relationship between the sender and the recipient among a plurality of personal relationship types;
    identifying second relationship information between the recipient and the electronic device, the identified second relationship information comprising a type of relationship between the recipient and the electronic device among a plurality of relationship types;
    converting, by the electronic device, the message based on the identified first relationship information between the sender and the recipient and the identified second relationship information between the recipient and the electronic device; and
    outputting, by the electronic device, the converted message,
    wherein the converting of the message comprises at least one of changing a first word of at least one word in the message to a second word or adding a third word into the message, based on the identified first relationship information and the type of the relationship between the recipient and the electronic device of the identified second relationship information.

2. The method of claim 1, wherein the converting of the message includes:
    identifying at least one voice variable for outputting the message based on the identified first relationship information and the identified second relationship information; and
    converting the message according to the identified at least one voice variable.

3. The method of claim 2, wherein the at least one voice variable includes at least one of a timbre, a pitch, a pause, a volume, and a velocity.

4. The method of claim 1, wherein the converting of the message includes:
    identifying at least one text generation variable for outputting the message based on the identified first relationship information and the identified second relationship information; and
    converting the message according to the identified at least one text generation variable.

5. The method of claim 4, wherein the text generation variable includes at least one of an additional word, a job field word, a social relations word, a general word, a historical word, an emotional word, and a user specific word.

6. The method of claim 1, wherein the converting of the message includes:
    identifying at least one behavior variable for outputting the message based on the identified first relationship information and the identified second relationship information, and
    converting the message according to the identified at least one behavior variable.

7. The method of claim 6, wherein the at least one behavior variable includes at least one of a display control, a driver control, and a connectivity control.

8. The method of claim 1, further comprising obtaining third relationship information between the sender and the electronic device,
    wherein the converting of the message includes converting the message based on the identified first relationship information, the identified second relationship information, and the third relationship information.

9. The method of claim 1, wherein the converting of the message includes:
    first converting the message into first text based on the identified first relationship information; and
    generating second text based on the identified second relationship information to generate a converted message including the first text and the second text.

10. The method of claim 1, wherein the converting of the message includes:
    identifying a first attribute of an electronic device corresponding to the sender and the recipient, and converting the message based on the identified first relationship information and fourth relationship information between the recipient and the first attribute.

11. The method of claim 10, wherein the first attribute is at least one of a friend, a secretary, a sibling, a parent, a worker in a particular job, and a child.

12. An electronic device comprising:
a processor configured to obtain a message from a sender; and
a memory electrically connected to the processor, wherein the memory is configured to store instructions that, when executed by the processor, cause the processor to:
identify a recipient of the message,
identify first relationship information between the sender and the recipient, the identified first relationship information comprising a type of personal relationship between the sender and the recipient among a plurality of personal relationship types,
identify second relationship information between the recipient and the electronic device, the identified second relationship information comprising a type of relationship between the recipient and the electronic device among a plurality of relationship types,
convert the message based on the identified first relationship information between the sender and the recipient and the identified second relationship information between the recipient and the electronic device, and
control to output the converted message,
wherein the converting of the message comprises at least one of changing a first word of at least one word in the message to a second word or adding a third word into the message, based on the identified first relationship information and the type of the relationship between the recipient and the electronic device of the identified second relationship information between.

13. The electronic device of claim 12, wherein the memory is further configured to store instructions executed to enable the processor to:
identify at least one voice variable for outputting the message based on the identified first relationship information and the identified second relationship information, and
convert the message according to the identified at least one voice variable.

14. The electronic device of claim 13, wherein the at least one voice variable includes at least one of a timbre, a pitch, a pause, a volume, and a velocity.

15. The electronic device of claim 12, wherein the memory is further configured to store instructions executed to enable the processor to:

identify at least one text generation variable for outputting the message based on the identified first relationship information and the identified second relationship information, and
convert the message according to the identified at least one text generation variable.

16. The electronic device of claim 15, wherein the text generation variable includes at least one of an additional word, a job field word, a social relations word, a general word, a historical word, an emotional word, and a user specific word.

17. The electronic device of claim 12, wherein the memory is further configured to store instructions executed to enable the processor to:
identify at least one behavior variable for outputting the message based on the identified first relationship information and the identified second relationship information, and
convert the message according to the identified at least one behavior variable.

18. The electronic device of claim 17, wherein the at least one behavior variable includes at least one of a display control, a driver control, and a connectivity control.

19. The electronic device of claim 12, wherein the processor is further configured to obtain third relationship information between the sender and the electronic device,
wherein the memory is further configured to store an instruction executed to enable the processor to convert the message includes converting the message based on the identified first relationship information, the identified second relationship information, and the third relationship information.

20. The electronic device of claim 12, wherein the memory is further configured to store instructions executed to enable the processor to:
first convert the message into first text based on the identified first relationship information, and
generate second text based on the identified second relationship information to generate a converted message including the first text and the second text.

21. The electronic device of claim 12, wherein the memory is further configured to store instructions executed to enable the processor to:
identify a first attribute of an electronic device corresponding to the sender and the recipient, and
convert the message based on the identified first relationship information and fourth relationship information between the recipient and the first attribute.

22. The electronic device of claim 21, wherein the first attribute is at least one of a friend, a secretary, a sibling, a parent, a worker in a particular job, and a child.

* * * * *